US010908937B2

(12) United States Patent
Shah et al.

(10) Patent No.: US 10,908,937 B2
(45) Date of Patent: Feb. 2, 2021

(54) AUTOMATIC DIRECTORY JOIN FOR VIRTUAL MACHINE INSTANCES

(71) Applicant: Amazon Technologies, Inc., Reno, NV (US)

(72) Inventors: Shon Kiran Shah, Redmond, WA (US); Gaurang Pankaj Mehta, Seattle, WA (US); Thomas Christopher Rizzo, Sammamish, WA (US); Guruprakash Bangalore Rao, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/098,323

(22) Filed: Dec. 5, 2013

(65) Prior Publication Data

US 2015/0160956 A1 Jun. 11, 2015

Related U.S. Application Data

(60) Provisional application No. 61/902,790, filed on Nov. 11, 2013.

(51) Int. Cl.
*G06F 9/455* (2018.01)
*H04L 29/06* (2006.01)
*H04L 12/24* (2006.01)

(52) U.S. Cl.
CPC .......... *G06F 9/45533* (2013.01); *H04L 63/08* (2013.01); *H04L 63/10* (2013.01); *G06F 2221/2113* (2013.01); *H04L 41/5096* (2013.01)

(58) Field of Classification Search
CPC ......... G06F 9/45533; G06F 2221/2113; H04L 63/08; H04L 63/10; H04L 41/5096
(Continued)

(56) References Cited

U.S. PATENT DOCUMENTS 6,055,637 A 4/2000 Hudson et al.
6,209,036 B1 * 3/2001 Aldred .................. G06F 16/958
709/229
(Continued)

FOREIGN PATENT DOCUMENTS

FR 2964813 3/2012
JP 2004355439 12/2004
(Continued)

OTHER PUBLICATIONS

Carrion et al. A Generic Catalog and Repository Service for Virtual Machine Images. [online] (2010). University of Valencia., pp. 1-15. Retrieved From the Internet <https://www.researchgate.net/profile/German_Molto/publication/233906883_A_Generic_Catalog_and_Repository_Service_for_Virtual_Machine_Images/links/0fcfd50cbb119a1184000000.pdf>.*
(Continued)

*Primary Examiner* — Emerson C Puente
*Assistant Examiner* — Jonathan R Labud
(74) *Attorney, Agent, or Firm* — Davis Wright Tremaine LLP

(57) ABSTRACT

A customer utilizes an interface provided by a virtual computer system service to provision a virtual machine instance and join this instance to a directory. The interface may have previously obtained the domain name and the Internet Protocol addresses for one or more directories available to the customer for joining the virtual machine instance. The virtual computer system service may communicate with a managed directory service to obtain a set of temporary credentials that may be used to transmit a request to the directory to allow joining of the virtual machine instance. Upon provisioning of the instance, an agent operating within the instance may be configured to obtain the domain name and Internet Protocol addresses for the direc-
(Continued)

tory to establish a connection with the directory. The agent may also be configured to obtain the set of temporary credentials to transmit a request to the directory for joining of the instance.

22 Claims, 11 Drawing Sheets

(58) Field of Classification Search
IPC .......... G06F 9/45533,2221/2113; H04L 63/08, 63/10, 41/5096
See application file for complete search history.

(56) References Cited

U.S. PATENT DOCUMENTS

| | | | |
|---|---|---|---|
| 6,374,295 B2* | 4/2002 | Farrow | H04L 29/12216 709/223 |
| 6,609,128 B1* | 8/2003 | Underwood | G06F 9/4448 707/610 |
| 7,574,202 B1* | 8/2009 | Tsao | H04L 63/0272 370/310 |
| 8,045,486 B2 | 10/2011 | Swan | |
| 8,145,798 B1 | 3/2012 | Buck et al. | |
| 8,224,994 B1 | 7/2012 | Schneider | |
| 8,255,984 B1 | 8/2012 | Ghostine et al. | |
| 8,307,003 B1 | 11/2012 | Sheth et al. | |
| 8,346,824 B1* | 1/2013 | Lyle | G06F 17/30206 707/822 |
| 8,533,796 B1* | 9/2013 | Shenoy et al. | 726/6 |
| 8,656,471 B1 | 2/2014 | Allen et al. | |
| 8,856,506 B2 | 10/2014 | Weber et al. | |
| 9,213,513 B2* | 12/2015 | Hartz | G06F 3/1288 |
| 9,639,384 B2 | 5/2017 | Govindnkutty et al. | |
| 9,678,769 B1 | 6/2017 | Scott et al. | |
| 2002/0133330 A1* | 9/2002 | Loisey | G06F 21/31 703/27 |
| 2002/0143943 A1 | 10/2002 | Lee et al. | |
| 2003/0074448 A1 | 4/2003 | Kinebuchi et al. | |
| 2003/0120610 A1* | 6/2003 | Hamber | G06Q 20/3674 705/67 |
| 2003/0229645 A1 | 12/2003 | Mogi et al. | |
| 2004/0205152 A1 | 10/2004 | Yasuda et al. | |
| 2005/0102513 A1 | 5/2005 | Alve | |
| 2005/0203993 A1 | 9/2005 | Grobman et al. | |
| 2006/0059252 A1 | 3/2006 | Tatsubori et al. | |
| 2007/0112877 A1 | 5/2007 | Harvey et al. | |
| 2007/0143829 A1 | 6/2007 | Hinton et al. | |
| 2007/0300220 A1 | 12/2007 | Seliger et al. | |
| 2007/0300221 A1 | 12/2007 | Hartz et al. | |
| 2008/0016143 A1 | 1/2008 | Bumpus et al. | |
| 2008/0046593 A1 | 2/2008 | Ando et al. | |
| 2008/0140618 A1 | 6/2008 | Kumar | |
| 2008/0208853 A1 | 8/2008 | Vismans et al. | |
| 2008/0320566 A1 | 12/2008 | Herzog et al. | |
| 2009/0089625 A1 | 4/2009 | Kannappan et al. | |
| 2009/0112875 A1 | 4/2009 | Maes | |
| 2009/0157850 A1 | 6/2009 | Gagliardi et al. | |
| 2009/0178132 A1 | 7/2009 | Hudis et al. | |
| 2009/0198835 A1 | 8/2009 | Madhusudanan et al. | |
| 2009/0249439 A1 | 10/2009 | Olden et al. | |
| 2009/0288084 A1 | 11/2009 | Astete et al. | |
| 2009/0328178 A1 | 12/2009 | McDaniel et al. | |
| 2010/0017889 A1 | 1/2010 | Newstadt et al. | |
| 2010/0122248 A1 | 5/2010 | Robinson et al. | |
| 2010/0142401 A1 | 6/2010 | Morris | |
| 2010/0254375 A1* | 10/2010 | Feuerhahn et al. | 370/352 |
| 2011/0066668 A1 | 3/2011 | Guarraci | |
| 2011/0099147 A1 | 4/2011 | McAlister et al. | |
| 2011/0185355 A1 | 7/2011 | Chawla et al. | |
| 2011/0191834 A1 | 8/2011 | Singh et al. | |
| 2011/0251992 A1 | 10/2011 | Bethlehem et al. | |
| 2011/0314520 A1 | 12/2011 | Olszewski et al. | |
| 2012/0011578 A1* | 1/2012 | Hinton | H04L 63/0815 726/8 |
| 2012/0017271 A1 | 1/2012 | Smith et al. | |
| 2012/0030673 A1 | 2/2012 | Sakamoto | |
| 2012/0066348 A1 | 3/2012 | Alnas | |
| 2012/0110055 A1 | 5/2012 | Van Biljon et al. | |
| 2012/0110574 A1 | 5/2012 | Kumar | |
| 2012/0158920 A1 | 6/2012 | Yang | |
| 2012/0179802 A1 | 7/2012 | Narasimhan et al. | |
| 2012/0179820 A1 | 7/2012 | Ringdahl et al. | |
| 2012/0198022 A1 | 8/2012 | Black et al. | |
| 2012/0233314 A1 | 9/2012 | Jakobsson | |
| 2012/0246738 A1 | 9/2012 | Shah et al. | |
| 2012/0266168 A1* | 10/2012 | Spivak et al. | 718/1 |
| 2012/0281708 A1 | 11/2012 | Chauhan et al. | |
| 2012/0290630 A1 | 11/2012 | Aizman et al. | |
| 2013/0007845 A1 | 1/2013 | Chang et al. | |
| 2013/0034021 A1 | 2/2013 | Jaiswal et al. | |
| 2013/0042115 A1* | 2/2013 | Sweet et al. | 713/176 |
| 2013/0054639 A1 | 2/2013 | Sharma et al. | |
| 2013/0066834 A1 | 3/2013 | McAlister et al. | |
| 2013/0167145 A1 | 6/2013 | Krishnamurthy et al. | |
| 2013/0174216 A1 | 7/2013 | Simske et al. | |
| 2013/0191828 A1 | 7/2013 | Wells et al. | |
| 2013/0198340 A1 | 8/2013 | Ukkola et al. | |
| 2013/0227140 A1 | 8/2013 | Hinton et al. | |
| 2013/0230042 A1 | 9/2013 | Shatsky et al. | |
| 2013/0238808 A1 | 9/2013 | Hallem et al. | |
| 2013/0247036 A1 | 9/2013 | Fujiwara | |
| 2013/0254847 A1 | 9/2013 | Adams et al. | |
| 2013/0283270 A1 | 10/2013 | Holland et al. | |
| 2013/0283298 A1 | 10/2013 | Ali et al. | |
| 2014/0040993 A1 | 2/2014 | Lorenzo et al. | |
| 2014/0075501 A1 | 3/2014 | Srinivasan et al. | |
| 2014/0201735 A1 | 7/2014 | Kannan et al. | |
| 2014/0250075 A1 | 9/2014 | Broido et al. | |
| 2014/0282510 A1 | 9/2014 | Anderson et al. | |
| 2014/0298398 A1 | 10/2014 | Neely | |
| 2014/0325622 A1 | 10/2014 | Luk et al. | |
| 2014/0365549 A1 | 12/2014 | Jenkins | |
| 2015/0058837 A1 | 2/2015 | Govindankutty et al. | |
| 2015/0089061 A1 | 3/2015 | Li et al. | |
| 2015/0237149 A1 | 8/2015 | MacInnis | |
| 2017/0337071 A1 | 11/2017 | Scott et al. | |

FOREIGN PATENT DOCUMENTS

| | | |
|---|---|---|
| JP | 2005004648 | 1/2005 |
| JP | 2005258672 | 9/2005 |
| JP | 2009519530 | 5/2009 |
| JP | 2009176097 | 8/2009 |
| JP | 2010027028 | 2/2010 |
| JP | 2010092475 | 4/2010 |
| JP | 2011186637 | 9/2011 |
| JP | 2012032956 | 2/2012 |
| JP | 2012123459 | 6/2012 |
| JP | 2013084235 | 5/2013 |
| JP | 2013527532 | 6/2013 |
| JP | 2013532854 | 8/2013 |
| JP | 2013540314 | 10/2013 |
| JP | 2015503782 | 2/2015 |
| JP | 2016540295 | 12/2016 |
| WO | WO2011106716 | 9/2011 |
| WO | WO2013146537 | 10/2013 |

OTHER PUBLICATIONS

Lopez et al. Providing secure mobile access to information servers with temporary certificates. [online] (1999). Elsevier., pp. 1-5. Retrieved From the Internet <http://ac.els-cdn.com/S138912869900105X/1-s2.0-S138912869900105X-main.pdf?_tid=8d31c448-e679-11e6-b14f-00000aacb35f&acdnat=1485732221_f0f3684af0254bee6476a83214f9cf32>.*

International Search Report and Written Opinion dated Feb. 4, 2015, International Patent Application No. PCT/US2014/064894, filed Nov. 10, 2014, 14 pages.

International Search Report and Written Opinion dated Feb. 19, 2015, International Patent Application No. PCT/US2014/065084, filed Nov. 11, 2014, 15 pages.

(56) References Cited

OTHER PUBLICATIONS

International Search Report and Written Opinion dated Feb. 11, 2015, International Patent Application No. PCT/US2014/065081, filed Nov. 11, 2014, 11 pages.
International Search Report and Written Opinion dated Feb. 23, 2015, International Patent Application No. PCT/US2014/065088, filed Nov. 11, 2014, 13 pages.
Bucicoiu et al., "Secure Cloud Video Streaming Using Tokens," RoEduNet Conference 13th Edition: Networking in Education and Research Joint Event RENAM 8th Conference, Jan. 2014, 6 pages.
Japanese Office Action, dated Oct. 11, 2017, for Application No. 2016-528219, 10 pages.
Anonymous, "Microsoft Windows Server 2008R2 Directory Services (DS) on Amazon EC2," Oct. 21, 2012, retrieved on May 10, 2017, from internet at https://web.archive.org/web/20121021194026/https://awsmedia.s3.amazonaws.com/pdf/EC2_Ad_How_to.pdf, 8 pages.
Anonymous, "vCloud Automation Center Operating Guide for vCloud Automation Center 5.2," VMware, Jul. 17, 2013, retrieved on May 8, 2017, from https://web-beta.archive.org/web/20130717235803/http://www.vmware.com/pdf/vcac-52-operating-guide.pdf, 332 pages.
Chinese First Office Action for Patent Application No. 201480068732.2 dated Jun. 15, 2018, 12 pages.
Chinese First Office Action for Patent Application No. 201480068869.8 dated Jun. 27, 2018, 12 pages.
Chinese First Office Action for Patent Application No. 201480072547.0 dated Jul. 2, 2018, 16 pages.
European Communication Under Rule 71(3) EPC for Application No. 14860094.3, Intention to Grant, dated Jul. 5, 2018, 57 pages.
European Communication under Rule 71(3) EPC for Application No. 14860654.4, Intention to Grant, dated Jul. 16, 2018, 149 pages.
European Communication under Rule 71(3) EPC for Application No. 14861058.7, Intention to Grant, dated Jun. 29, 2018, 55 pages.
Japanese Decision to Grant dated Jun. 11, 2018 for Patent Application No. 2016-528232, 6 pages.
Japanese Decision to Grant for Patent Application No. 2016-528219 dated Aug. 20, 2018, 6 pages.
Canadian Notice of Allowance for Patent Application No. 2,930,253 dated Dec. 7, 2017, 1 page.
Canadian Office Action for Patent Application No. 2,930,255 dated Apr. 16, 2018, 5 pages.
Canadian Office Action for Patent Application No. 2,930,281 dated Nov. 23, 2017, 6 pages.
Canadian Office Action for Patent Application No. 2,930,292 dated Feb. 9, 2018, 4 pages.
Japanese Final Rejection, dated Dec. 18, 2017, for Patent Application No. 2016-528232, 6 pages.
Japanese Patent Application No. 2016-528217, Decision to Grant a Patent, dated Jan. 15, 2018, filed Nov. 10, 2014, 6 pages.
Anonymous, "AWS Identity and Access Management Using IAM," dated Jun. 20, 2013, retrieved on Feb. 12, 2019 from https://web.archive.org/web/20130620090425if_/http://awsdocs.s3.amazonaws.com/IAM/latest/iam-ug.pdf, 219 pages.
Canadian Notice of Allowance for Patent Application No. 2,930,255 dated Apr. 2, 2019, 1 page.
Canadian Notice of Allowance for Patent Application No. 2,930,292 dated Feb. 1, 2019, 1 page.
Canadian Office Action, dated Oct. 22, 2018, for Patent Application No. 2,930,281, 4 pages.
Chinese First Office Action for Patent Application No. 201480068648.0 dated Dec. 12, 2018, 8 pages.
Chinese Notice of Grant for Patent Application No. 201480068732.2 dated Mar. 15, 2019, 4 pages.
Chinese Notice of Grant for Patent Application No. 201480068869.8 dated Mar. 14, 2019, 4 pages.
Chinese Second Office Action dated Jun. 25, 2019, for Patent Application No. 201480068648.0, 9 pages.
Chinese Second Office Action for Patent Application No. 201480068732.2 dated Nov. 21, 2018, 7 pages.
Chinese Second Office Action for Patent Application No. 201480072547.0 dated Feb. 11, 2019, 12 pages.
European Communication pursuant to Article 94(3) EPC dated Apr. 17, 2018, for Application No. 14859670.3, 3 pages.
European Communication under Rule 71(3) EPC for Application No. 14859670.3, Intention to Grant, dated Jan. 3, 2019, 58 pages.
European Search Report dated Feb. 22, 2019, for Patent Application No. EP18204451, 9 pages.
Japanese First Office Action for Patent Application No. 2016-528217 dated Feb. 2, 2019, 5 pages.
Japanese Notice to Grant, dated Jul. 8, 2019, for Patent Application No. 2018-073523, 6 pages.
Japanese Office Action, dated Jun. 17, 2019, for Patent Application No. 2018-073523, 5 pages.
Canadian Office Action for Patent Application No. 2,930,281 dated Oct. 3, 2019, 5 pages.
Chinese Decision to Grant for Application No. 201480068648.0 dated Sep. 27, 2019, 4 pages.
Japanese Decision to Grant for Patent Application No. 2018-016902 dated Sep. 18, 2019, 6 pages.
Chinese Notice of Grant for Patent Application No. 201480072547.0 dated Jan. 6, 2020, 4 pages.
European Communication Under Rule 71(3) EPC for Application No. 18204451.1, Intention to Grant, dated Jan. 27, 2020, 52 pages.

\* cited by examiner

AUTOMATIC DIRECTORY JOIN FOR VIRTUAL MACHINE INSTANCES

CROSS REFERENCE TO RELATED APPLICATIONS

This application claims the benefit of U.S. Provisional Application No. 61/902,790, filed on Nov. 11, 2013, entitled "MANAGED DIRECTORY SERVICE," the content of which is incorporated by reference herein in its entirety.

BACKGROUND

Customers utilize directory services to create and maintain a directory (e.g., file systems, files, users, security policies, network resources, applications, system storage, etc.) for data management and, generally, access to a variety of resources. The directory service may be configured to create a directory in a data center operated by the customer (e.g., on-premises) or in a remote network (e.g., off-premises), dependent on the customer's business needs. However, a customer desiring to maintain a directory on-premises and off-premises may encounter numerous difficulties. For instance, a customer utilizing an on-premises directory may be required to create a separate directory off-premises and sync data between the two directories to maintain the same set of data. This may require the customer to maintain multiple accounts for each user of the directories. Further, maintenance of multiple directories may increase the administrative burden of the customer, as maintenance and security of the multiple directories may require additional resources. Exacerbating the problem, users may have to perform a complex set of operations to join a computer system to a directory.

BRIEF DESCRIPTION OF THE DRAWINGS

Various embodiments in accordance with the present disclosure will be described with reference to the drawings, in which.

DETAILED DESCRIPTION

Figure 1:
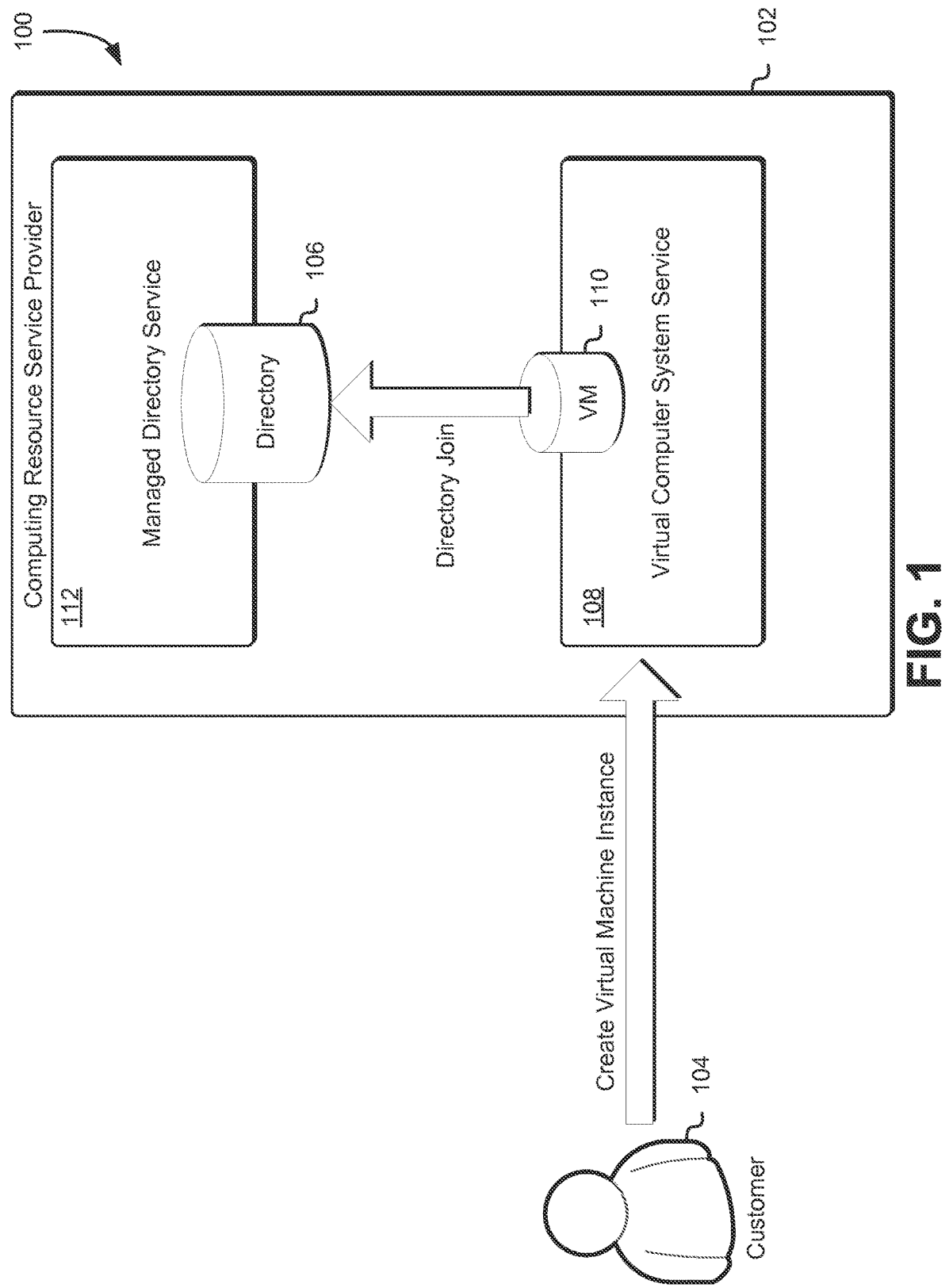
FIG. 1 is an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to automated joining of a computer system instance, such as a virtual machine or other instance to a directory. In an embodiment, an entity (e.g., an organization) may communicate with a virtual computer system service, such as through one or more appropriately configured application programming interface (API) calls to the service, to request creation of a virtual machine instance that may be joined to a directory. The entity may be a customer of a computing resource service provider that operates various services such as a managed directory service, object-based data storage services, database services, the aforementioned virtual computer system service and a plurality of other services.

In various embodiments, an entity interfaces with the virtual computer system service through a graphical user interface (GUI) configured to transmit one or more appropriately configured API calls (e.g., API call configured to be fulfillable by the system receiving the API call) to the service to specify which directory the virtual machine instance should be added to. For instance, in an embodiment, the GUI is configured to transmit one or more appropriately configured API calls to a managed directory service to obtain a list of one or more available directories that may be used to add a virtual machine instance. Accordingly, this list may be presented to the entity through the GUI, at which point the entity may select the appropriate directory from the list. Alternatively, if the entity does not have any existing directories available, the GUI may include an option that would enable an entity to create a new directory which may be used to add the virtual machine instance.

In an embodiment, in addition to the list of one or more available directories, the GUI may further obtain network address information (e.g., a fully qualified domain name (FQDN) and one or more domain name system (DNS) Internet Protocol (IP) addresses) from the managed directory service for each of the one or more available directories. Thus, when an entity uses the GUI to create a new virtual machine instance and selects the directory that is to be used to add the newly created virtual machine instance, the GUI may transmit the FQDN, DNS IP address and the directory identification to a management sub-system within the virtual computer system service. Accordingly, the management sub-system may utilize the FQDN, DNS IP address and the directory identification to obtain one or more credentials for the directory and store all of these items as metadata within a metadata service within the virtual computer system service.

In an embodiment, when a virtual machine instance is created, the virtual computer system service transmits one or more appropriately configured API calls to a managed directory service to obtain one or more credentials specific to the directory that may be necessary for the virtual machine instance to join the directory. In some embodiments, the virtual computer system service is configured to store these one or more obtained credentials, as well as a fully qualified domain name (FQDN) and DNS Internet Protocol (IP) addresses, as metadata within a metadata service within the virtual computer system service. Accordingly, an agent within the newly created virtual machine instance may be configured to access this metadata service and read the metadata to obtain the aforementioned information. Thus, the agent operating within the virtual machine instance may utilize this information to generate and transmit one or more appropriately configured API calls to the directory to add the instance to the directory.

In this manner, a customer is able to utilize a GUI to create a virtual machine instance and automatically have the virtual machine instance join a new or existing directory. In addition, the techniques described and suggested herein facilitate additional technical advantages. For example, because the virtual machine instance is automatically joined to the directory, the customer may no longer be required to retrieve additional sets of credentials in order to manually join a virtual machine instance to the directory. This, in turn, may allow the customer to make the directory available to other users in less time and thus reduce any downtime resulting from a delay in implementation of the directory. Further, this may allow the customer and other users to use a set of credentials for accessing the new or existing directory to access the newly created virtual machine instance.

FIG. 1 shows an illustrative example of an environment 100 in which various embodiments may be practiced. In the environment 100, a computing resource service provider 102 provides various computing resource services to customers of the computing resource service provider. The computing resource service provider 102 may be an organization that hosts various computing resources on behalf of one or more customers. For example, a computing resource service provider 102 may operate one or more facilities that are used to host various computing hardware resources, such as hardware servers, data storage devices, network devices, and other equipment, such as server racks, networking cables and the like. The computing resource service provider 102 may utilize its computing hardware resources to operate one or more services. Such services may include services that enable customers of the computing resource service provider 102 to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services may be used by customers to support a wide variety of activities, such as operating a website, operating enterprise systems supporting an organization, distributed computation and/or other activities.

Accordingly, as illustrated in FIG. 1, the environment 100 includes a customer 104. The customer 104 may be an individual, organization or automated process that could utilize one or more services provided by the computing resource service provider 102 to operate and manage a directory 106 to support his or her operations. In order to operate and manage the directory 106, for instance, the customer 104 may be required to create and join a virtual machine instance 110 to the directory 106. For instance, the virtual machine instance 110 may enable the customer 104 to create and provide credentials for additional users of the directory 106, as well as deploy various applications and apply one or more security policies for the directory 106. Accordingly, the customer 104 may, through a customer computer system device, submit one or more requests to a virtual computer system service 108 provided by the computing resource service provider 102 to configure a virtual machine instance 110 and request that the virtual machine instance 110 be added to a directory 106.

As will be discussed in greater detail below, the virtual computer system service 108 may include a graphical user interface (GUI) which may enable a customer 104 to submit the one or more requests to the virtual computer system service 108. For instance, in an embodiment, the GUI is configured to transmit one or more appropriately configured API calls to a managed directory service 112 to request a listing of all available directories 106 that the customer 104 currently has access to, as well as network address information (e.g., fully qualified domain name (FQDN) and domain name system (DNS) Internet Protocol (IP) addresses) for each of the directories 106 within the listing. The listing of all available directories 106 may be used to populate a menu within the GUI that the customer 104 may use to select a directory 106 that is to be used to add the virtual machine instance 106. Accordingly, once the customer 104 has specified which directory 106 is to be used for the newly created virtual machine instance 110, the GUI may transmit the identification, FQDN and the DNS IP address of the directory 106 to a management sub-system within the virtual computer system service 108.

In some embodiments, a managed directory service is configured to manage directory services such as user access, policies, stores, applications, security and/or other such resources on behalf of a computer system and may also be configured as an interface to those directory services. A managed directory service may be configured to manage directory services for a directory, such as an enterprise directory. A directory may contain a database of information about various objects in the directory. The objects may correspond to resources and security principals and, therefore, may contain user access objects, policy objects, store objects, applications link objects, security objects and/or other such objects. A directory database may also include relationships between those database objects, so that the directory is usable to manage, for example, which users have access to which stores.

Once the virtual machine instance 110 has been created, the virtual computer system service 108 may communicate, such as through one or more appropriately configured API calls, with a managed directory service 112 to obtain a set of credentials necessary to join the virtual machine instance 110 to the directory 106. The virtual computer system service 108 may be configured to store the set of credentials, as well as additional information (e.g., FQDN, DNS IPs, directory identification, etc.), as metadata within the service and make it available to the virtual machine instance 110. Accordingly, the virtual machine instance 110 may be configured to obtain the metadata from the virtual computer system service 108 and extract the set of credentials and additional information needed to join the directory 106. The virtual machine instance 110 may be configured to utilize the additional information to establish a connection to the directory 106 and to further utilize the set of credentials to join the virtual machine instance 110 to the directory 106. Once the virtual machine instance 110 has been joined to the directory 106, the customer 104, as well as any other delegated user, may utilize a set of credentials for accessing the directory 106 to access the virtual machine instance 110 as well.

Figure 2:
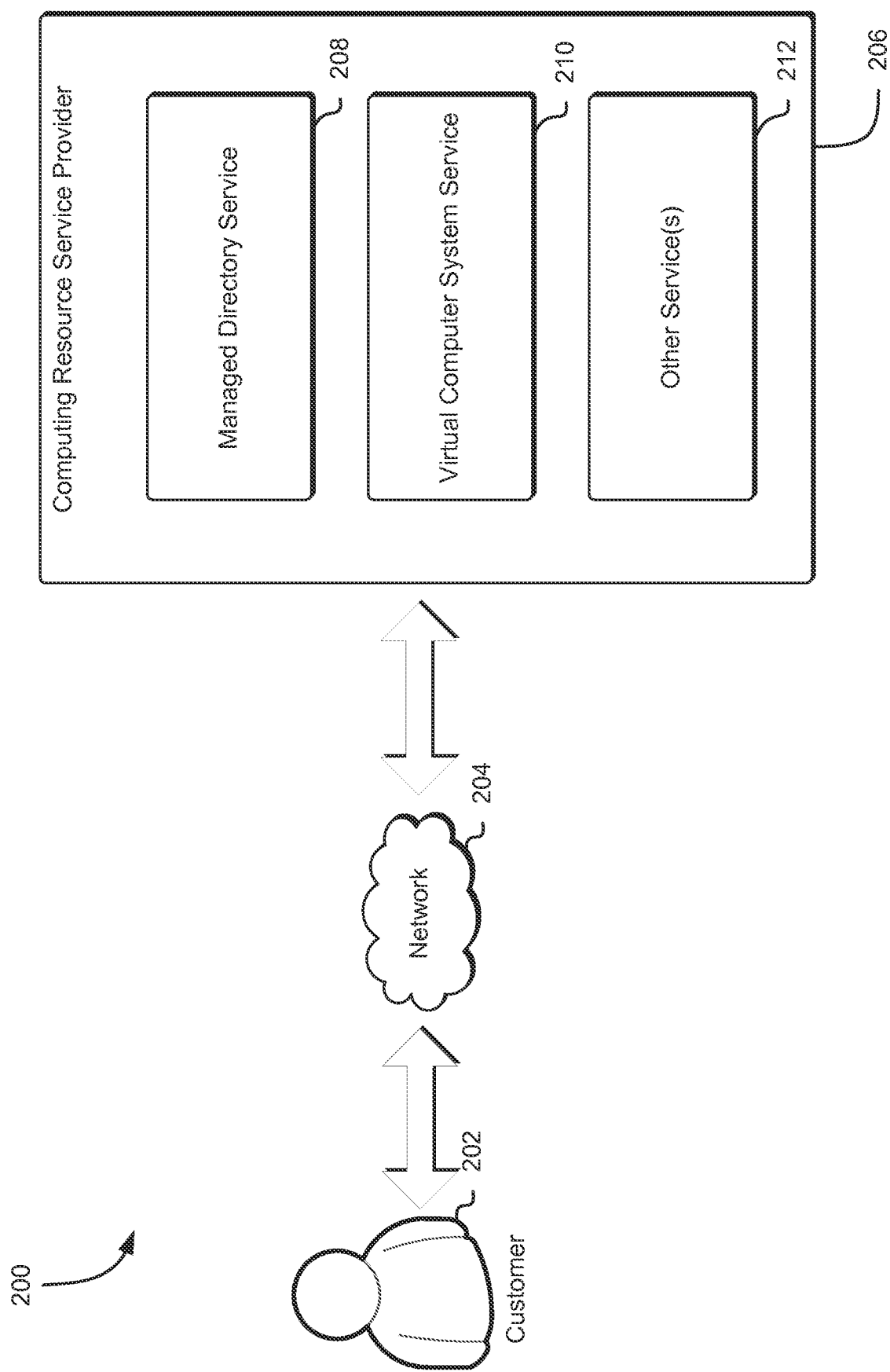
FIG. 2 is an illustrative example of an environment in which various embodiments can be implemented.

FIG. 2 shows an illustrated example of an environment 200 in which various embodiments of the present disclosure may be practiced. In the environment 200, a computing resource service provider 206 may provide a variety of services to a customer 202. The customer 202 may be an organization that may utilize the various services provided by the computing resource service provider 206 to remotely generate, test and maintain one or more directories and virtual machine instances necessary to operate the one or more directories. As illustrated in FIG. 2, the customer 202 may communicate with the computing resource service provider 206 through one or more communications networks 204, such as the Internet. Some communications from the customer 202 to the computing resource service provider 206 may cause the computing resource service provider 206 to operate in accordance with various techniques described herein or variations thereof.

As noted above, a computing resource service provider 206 may provide various computing resource services to its customers. For instance, in this particular illustrative example, the computing resource service provider 206 provides at least two types of services. The services provided by the computing resource service provider, in this example, include a managed directory service 208, a virtual computer system service 210, and one or more other services 212, although not all embodiments of the present disclosure will include all such services, and additional services may be provided in addition to or as an alternative to services explicitly described herein.

The managed directory service 208 may provide a variety of services to enable computer systems and/or computer system client devices to access customer directories including, but not limited to, authentication, authorization and directory services. For example, the managed directory service 208 may provide authentication services which may authenticate credentials of a user, computer system, process, automated process or other such entity to at least determine whether that entity is authorized to access the managed directory service 208 and/or the customer directories associated with the managed directory service 208. In some embodiments, the credentials may be authenticated by the managed directory service 208 itself, or they may be authenticated by a process, program or service under the control of the managed directory service 208, or they may be authenticated by a process, program or service that the managed directory service 208 may communicate with, or they may be authenticated by a combination of these and/or other such services or entities.

The managed directory service 208 may also provide authorization services which may authorize a user, computer system, process, automated process or other such entity to at least determine which actions of one or more possible actions that entity may perform. Examples of actions that an entity may or may not be authorized to perform include, but are not limited to, creating directories on the customer directory, destroying directories on the customer directory, attaching to directories on the customer directory, detaching from directories on the customer directory, providing access links to directories on the customer directory, reclaiming access links to directories on the customer directory, allowing reads from directories on the customer directory, allowing writes to directories on the customer directory and/or other such actions.

The managed directory service 208 may also provide directory services which may provide an authenticated entity access to the customer directories according to the authorization credentials and/or policies. For example, in an embodiment where a computer system entity may be authorized to read and write a certain data store on a customer directory, the ability to do so may be provided by the directory services. Directory services may provide access to customer directories by providing links to the customer directory locations such as by a uniform resource identifier (URI) object or some other such linkage. As may be contemplated, the URI may be provided by the computer system client device, or by a process running at the data center, or by a process running on a computer system connected to the data center, or by the managed directory service 208, or by a combination of these and/or other such computer system entities.

The virtual computer system service 210 may be a collection of computing resources configured to instantiate virtual machine instances onto virtual computer systems on behalf of the customers 202 of the computing resource service provider 206. Customers 202 of the computing resource service provider 206 may interact with the virtual computer system service 210 to provision and operate virtual computer systems that are instantiated on physical computing devices hosted (e.g., physical hosts) and operated by the computing resource service provider 206. The virtual computer systems may be used for various purposes, such as to operate as servers supporting a customer directory. Other applications for the virtual computer systems may be to support database applications, electronic commerce applications, business applications and/or other applications.

When a customer 202 interacts with the virtual computer system service 210 to provision a virtual machine instance that is to be joined to a customer directory, the customer 202 may gain access to a variety of resources. For instance, a virtual machine instance may provision an operating system and a variety of applications depending on the customer's needs. The virtual machine instance, as noted above, may be instantiated on a physical host which may be operated by the computing resource service provider 206. The virtual machine instance may include an agent that may be configured to access the virtual computer system service 210 to obtain metadata necessary to join the virtual machine instance to the customer directory. Accordingly, the virtual computer system service 210 may be configured to interact with the managed directory service 208 to obtain information and credentials necessary to connect to the customer directory. As noted above, this may include the customer directory identification, FQDN, DNS IP addresses and one or more passwords necessary to perform the directory joining.

The computing resource service provider 206 may additionally maintain one or more other services 212 based on the needs of its customers 202. For instance, the computing resource service provider 206 may maintain a database service for its customers 202. A database service may be a collection of computing resources that collectively operate to run one or more databases for one or more customers 202. Customers 202 of the computing resource service provider 206 may operate and manage a database from the database service by utilizing appropriately configured API calls to the service. This, in turn, may allow a customer 202 to maintain and potentially scale the operations in the database. Other services include, but are not limited to, object-level data storage services, object-level archival data storage services, services that manage other services and/or other services.

Figure 3:
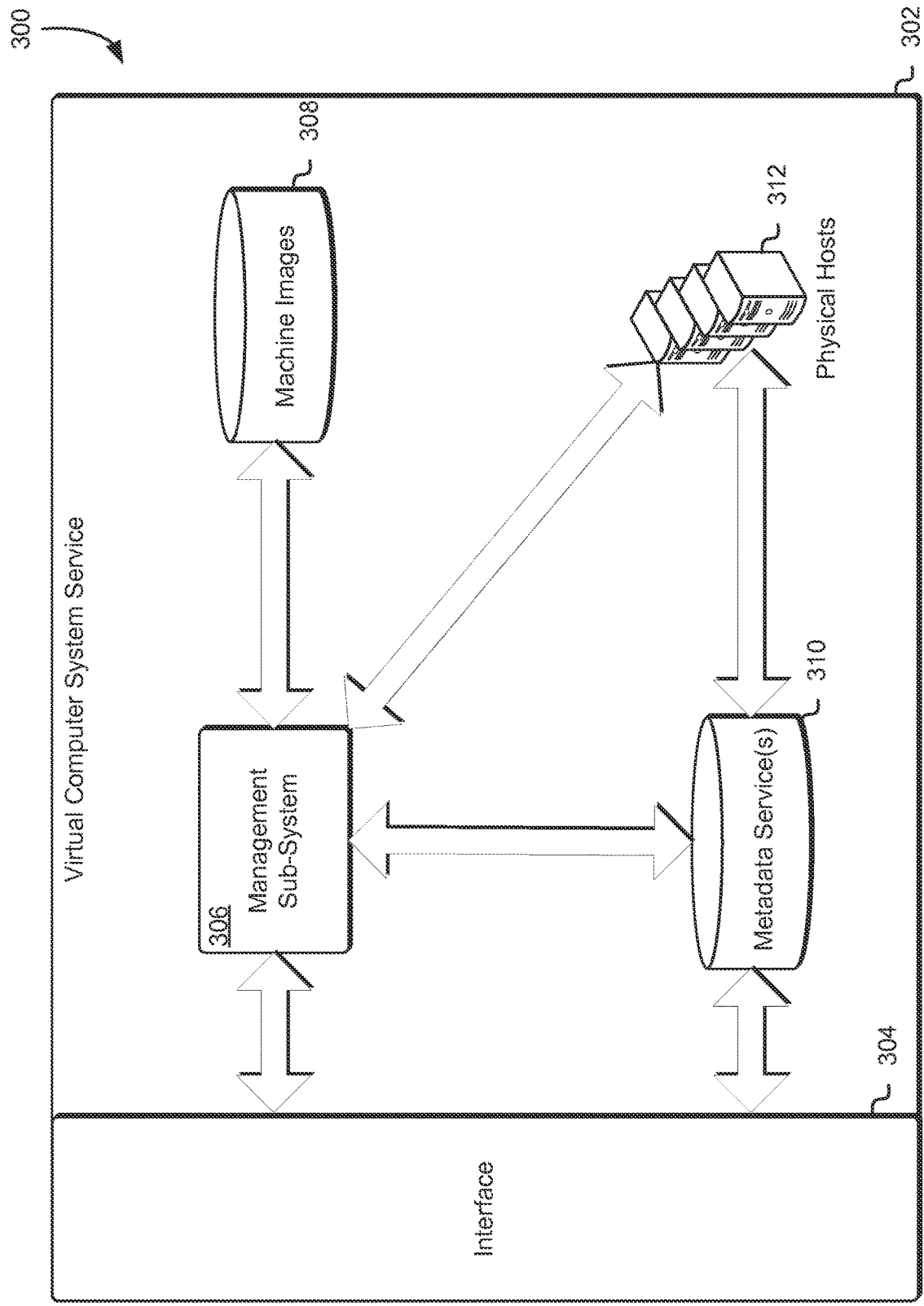
FIG. 3 is an illustrative example of the one or more components that comprise a virtual computer system service in accordance with at least one embodiment.

As noted above, a virtual computer system service may be used by one or more customers to provision a virtual machine instance and join this virtual machine instance to a customer directory. Accordingly, FIG. 3 shows an illustrative example of an environment 300 that includes various components of a virtual computer system service 302 in accordance with at least one embodiment. The virtual computer system service 302 may provide customers with an interface 304 that may enable a customer to access the virtual computer system service 302. A customer may utilize the interface 304 through one or more communications networks, such as the Internet. The interface 304 may include certain security safeguards to ensure that the customer has authorization to access the virtual computer system service 302. For instance, in order to access the virtual computer system service 302, a customer may need to provide a username and a corresponding password or encryption key when using the interface 304. Additionally, requests (e.g., API calls) submitted to the interface 304 may require an electronic signature generated using a cryptographic key such that the electronic signature is verifiable by the virtual computer system service 302, such as by an authorization system (not shown).

Once the customer has gained access to the virtual computer system service 302 through the interface 304, the virtual computer system service 302 may allow the customer to interact, through the interface 304, with a management sub-system 306. For instance, the management sub-system 306 may enable a customer to remotely provision a virtual machine instance. A customer may use the interface 304 and the management sub-system 306 to generate a virtual machine instance that includes an operating system and a variety of applications suited to the customer's needs. The operating system and the various applications may be maintained in data storage in the form of machine images 308. The virtual computer system service 302 may maintain a variety of machine images 308 based on specific customer preferences, as specified in the management sub-system 306. When a customer submits a request for provisioning a virtual machine instance through the management sub-system 306, the virtual computer system service 302 may identify the machine image the customer has requested and allocate the resources necessary (e.g., the processors and random-access memory (RAM) required to operate the components of the machine image) to process the machine image. The machine image may be instantiated on one or more physical storage devices (e.g., one or more servers or hard drives) that may act as a physical host 312 for the instance.

In addition to utilizing the interface 304 and the management sub-system 306 to remotely provision a virtual machine instance, the customer may utilize the interface 304 to specify a customer directory that may be used to add the newly created virtual machine instance. Accordingly, as will be described in greater detail below, the interface 304 may be configured to transmit one or more appropriately configured API calls to a managed directory service to obtain a listing of all available customer directories that may be used to add the virtual machine instance. In response to the API calls to the managed directory service, the interface 304 may obtain for each customer directory, the FQDN, DNS IP addresses and the customer directory identification. The customer directory identification may be used to provide to the customer the listing of any available customer directories that may be used to join the virtual machine instance. Based at least in part on the customer's selection of the customer directory to be used, the interface 304 may transmit to the management sub-system 306 the selected customer directory identification, FQDN and the DNS IP addresses for the customer directory.

Once the management sub-system 306 has created the virtual machine instance, the management sub-system 306 may transmit one or more appropriately configured API calls to the managed directory service to obtain one or more credentials that may be necessary to join the virtual machine instance to the selected customer directory. The management sub-system 306 may subsequently transfer the one or more credentials, as well as the FQDN and the DNS IP addresses for the selected customer directory, to a metadata service 310. This may enable an agent within the virtual machine instance to access this metadata service 310, obtain the one or more credentials and additional information, and join the virtual machine instance to the selected customer directory. While the metadata service 310 is used throughout the present disclosure to illustrate a mechanism for storing the one or more credentials, the FQDN and the DNS IP addresses for the selected customer directory, as well as the one or more credentials, as metadata, this information may be stored in other ways that do not utilize a separate metadata service. For instance, the FQDN, DNS IP addresses and the one or more credentials may be provided directly to an instance. Accordingly, the virtual computer system service 302 need not include the metadata service 310 and may include an alternative service for storing the FQDN, DNS IP addresses and the one or more credentials according to the format used.

Figure 4:
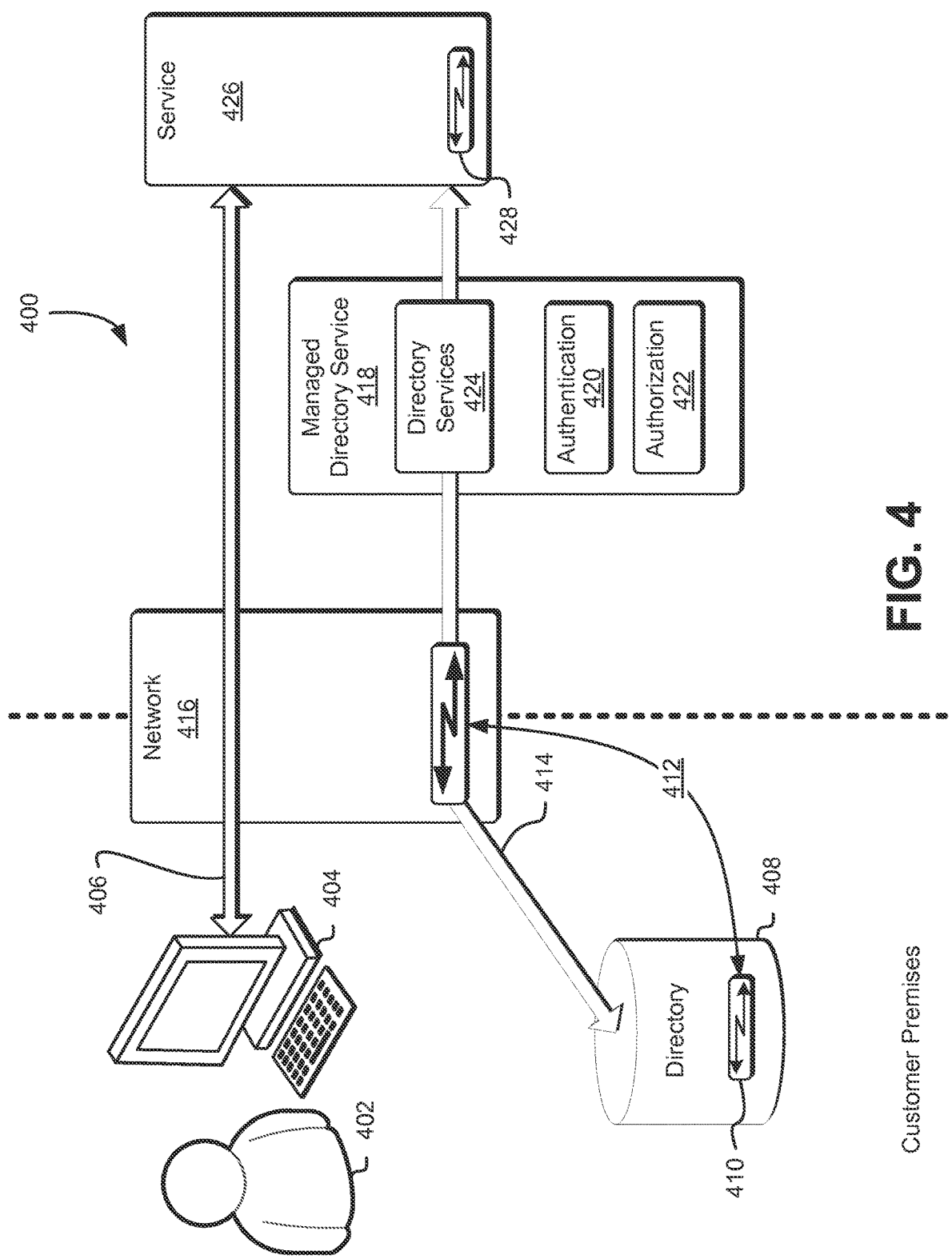
FIG. 4 is an illustrative example of an environment where computer system resources may be accessed by computer system entities in accordance with at least one embodiment.

As noted above, the virtual computer system service may include an interface and a management sub-system that may both be configured to communicate with a managed directory service to obtain credentials and additional information necessary to join a newly created virtual machine instance to a customer directory. Accordingly, FIG. 4 illustrates an environment 400 for accessing computer system directory resources including, but not limited to, computer system services such as directory services and resources such as user resources, policy resources, network resources and/or storage resources associated with the directory services, on distributed and/or virtualized computer system environments as well as the associated code running thereon in accordance with at least one embodiment. A computer system entity, user or process 402 may connect to a computer system through a computer system client device 404 and may request access via connection 406 to one or more services 426. The command or commands to request access to a service may originate from an outside computer system and/or server, or may originate from an entity, user or process on a remote network location, or may originate from the computer system, or may originate from a user of the computer system client device, or may originate as a result of a combination of these and/or other such objects. The command or commands to request access to a service may, in some embodiments, be issued by a privileged user, or by an unprivileged user, or by an autonomous process, or as a result of an alarm or condition or by a combination of these and/or other methods.

The computer system client device may request access to services via one or more networks 416 and/or entities associated therewith, such as other servers connected to the network, either directly or indirectly. The computer system client device may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others.

In some embodiments, the computer system may include one or more local computer system resources 408 which may be located at least in part on the customer premises and which may store files and/or other computer system resources thereon including, but not limited to, directories, applications, data, databases, links to other computer system resources, system drivers, computer operating systems, virtual machines and/or other such resources. In some embodiments, the local computer system resources may be local file system resources and may be stored on a variety of storage devices such as system random access memory (RAM), disk drives, solid state drives, removable drives or combinations of these and/or other such storage devices. In some embodiments, the local computer system resources may be located at least in part in a datacenter (a plurality of computer system resources, services and/or storage devices that may be collocated) that may be accessed by the computer system client device via one or more connections such as, for example, the network connections described herein. The computer system resources and/or the datacenter may be located locally or a combination of locally and remotely. For example, in some embodiments, a file system and/or directory may be located on a disk located in a local datacenter and the contents of the file system and/or directory may also be replicated to a disk located in a remote datacenter. In some other embodiments, a file system and/or directory may have at least a part of its contents located in one datacenter that may be local, and other parts of its contents located in one or more other datacenters that may be local or remote. The storage devices may include physical devices such as those described herein and/or virtual representations of such physical devices. For example, a file system and/or directory storage device may include some amount of physical memory, part of which is dedicated to storage as a virtual disk drive with a file system created on the virtual disk drive. Other such local storage devices may be considered as within the scope of this disclosure.

In some embodiments, the service 426 may need access to one or more computer system directory resources such as those described herein. The service 426 may, in some embodiments, include a variety of other computer system entities including, but not limited to, users, other computer systems, processes and/or automated processes and/or other such computer system entities. Access 414 to the system directory resources may, in some embodiments, be provided by a service such as a managed directory service 418, which may provide access to one or more system resources. The managed directory service may provide a variety of services to enable computer systems and/or computer system client devices to access system resources including, but not limited to, 420 authentication, 422 authorization and 424 directory services.

For example, the managed directory service may provide 420 authentication services which may authenticate credentials of a user, computer system, process, automated process or other such entity to at least determine whether that entity is authorized to access the managed directory service and/or the system resources associated with the managed directory service. In some embodiments, the credentials may be authenticated by the managed directory service itself, or they may be authenticated by a process, program or service under the control of the managed directory service, or they may be authenticated by a process, program or service that the managed directory service may communicate with, or they may be authenticated by, a combination of these and/or other such services or entities.

The managed directory service may also provide 422 authorization services which may authorize a user, computer system, process, automated process or other such entity to at least determine which actions of one or more possible actions that entity may perform. For example, in the case of a computer system resource such as a file system resource, actions that an entity may or may not be authorized to perform include, but are not limited to, creating file systems on the file system resource, destroying file systems on the file system resource, attaching to file systems on the file system resource, detaching from file systems on the file system resource, providing access links to file systems on the file system resource, reclaiming access links to file systems on the file system resource, allowing reads from file systems on the file system resource, allowing writes to file systems on the file system resource and/or other such file system resource actions.

Actions on system resources may include, but not be limited to, actions on directories, files, applications, data, databases, links to other resources, system drivers, operating systems, virtual machines and/or other such system resource objects thereon and may include such actions as the actions mentioned herein. Actions to start, stop, reclaim, destroy and/or otherwise manage the system resources as well as other such actions may also be included in the available actions. Authorization to perform actions may be managed by an entity such as a credentialing or policy system such as a system that, for example, maintains a set of credentials and/or policies related to a certain entity and may determine, based at least in part on the set of credentials and/or policies which actions an entity is authorized to perform. The actions that an entity may be authorized to perform may be static or may vary according to a number of factors including, but not limited to, time of day, type of credentials, system policies, nature, type or location of the object being accessed or a combination of these and/or other such authorization factors. For example, a computer system entity may be authorized only to read certain files on a file system, to read and write certain other files on a file system, and to add and delete certain other files on a file system. A different computer system entity may be authorized to perform any actions on the file system, but only if those actions are initiated from a certain location and at a certain time. One or more processes may be authorized only to write to a file on a file system, such as, for example, a system log, while other processes may only be authorized to read from the file. As may be contemplated, these are illustrative examples. Other types of operations may be authorized by the managed directory service authorization system and such other types of operations are also considered as being within the scope of the present disclosure.

The managed directory service may also provide 424 directory services which may provide an authenticated entity access 414 to computer system resources according to the authorization credentials and/or policies. For example, in an embodiment where a computer system entity may be authorized to read and write a certain data store on a computer system resource such as a file system resource, the ability to do so may be provided by the directory services. Directory services may provide access to the file system resource by providing links to the file system resource locations such as by a URI object or some other such linkage. The URI may be provided by the computer system client device, or by a process running at the data center, or by a process running on a computer system connected to the datacenter, or by the managed directory service or by a combination of these and/or other such computer system entities.

In some embodiments, the access to the computer system resources may be provided in such a way that the access is invisible to the requesting entity. For example, the access 414 may be provided to a requesting entity as a URI or other such link to a location 410 on the local file system 408. The location on the computer system resource may be 412 translated into a URI by one or more processes running on the computer system. The service or entity 426 that requested the access to the computer system resource may use the 428 received URI to access the computer system resource without requiring configuration that is dependent on the location of the computer system resource and may, in some embodiments, use the URI to link to the computer system resource to operate as if the service or entity 426 were directly connected to the computer system resource. Operations that, for example, appear to write a set of data to a file that may appear to the service or entity to be located in a location local to the service or entity, may actually package the data into a network packet and may then transfer the packet over the network 416 via the access link 414, to be actually written to a file located on local file system 408. As may be contemplated, these are illustrative examples and other types of operations which may be performed by the managed directory service may also be considered as within the scope of the present disclosure.

As noted above, a customer may utilize an interface provided by the virtual computer system service to create a virtual machine instance and specify a customer directory that is to be used to join the virtual machine instance. However, if no customer directories are available, the customer may be presented with the option to additionally create a new customer directory and join the virtual machine instance to this new customer directory. Accordingly, FIG. 5 is an illustrative example of an environment 500 in which a newly created virtual machine instance 510 is joined to a newly created customer directory 522 in accordance with at least one embodiment.

The customer may access the virtual computer system service 502 through the interface 504 to request provisioning of a virtual machine instance 510. It should be understood that if a browser or other application is used to display the interface 504, the browser or other application may transmit the one or more appropriately configured API calls from the interface 504 to other services. Alternatively, the browser or other application used for displaying the interface 504 may be configured to transmit information provided by the customer to the virtual computer system service 502. Subsequently, the virtual computer system service 502 may transmit the one or more appropriately configured API calls to other services. As noted above, the interface 504 may be configured to transmit one or more appropriately configured API calls to a managed directory service 514 to obtain a listing of all available customer directories 522 that the customer may have access to. Accordingly, in response to the one or more API calls from the interface 504, the managed directory service 514 may transmit a listing of the available customer directories 522, as well as the FQDN and DNS IP addresses for each of the customer directories 522. However, if there are no available customer directories 522, the managed directory service 514 may transmit a null listing to the interface 504. Accordingly, the interface 504 may be configured to present the customer with an option to create a new customer directory 522 and to join the virtual machine instance 510 with this new customer directory 522.

Figure 5:
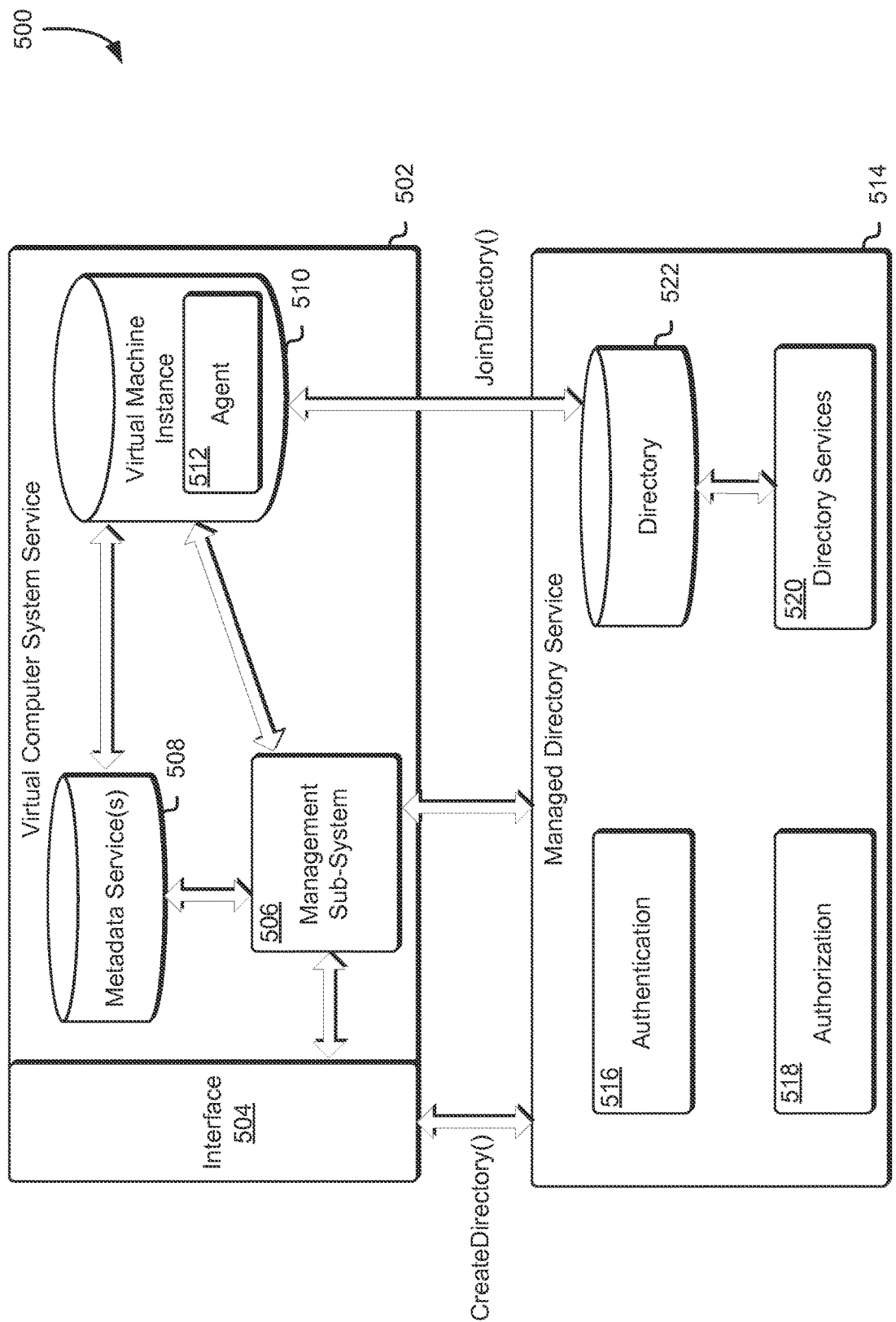
FIG. 5 is an illustrative example of creating a new directory and virtual machine instance with automatic joining of the virtual machine instance in accordance with at least one embodiment.

If the customer specifies, through the interface 504, that the new virtual machine instance 510 should be joined to a new customer directory 522, the interface 504 may transmit one or more appropriately configured API calls (such as "CreateDirectory( )" as illustrated in FIG. 5) to the managed directory service 514 to create the new customer directory 522. Accordingly, the directory services 520 within the managed directory service 514 may process the request and determine whether the customer is authorized to create a new customer directory 522. If the customer is authorized to create a new customer directory 522, the directory services 520 may create the customer directory 522 on the customer's premises with local permissions (e.g., the customer and delegated users may access the customer directory 522 utilizing credentials specific to the customer directory 522). In some embodiments, the customer directory 522 may be created such that the customer and other users may utilize their computing resource service provider credentials to access the customer directory 522.

Once the new customer directory 522 has been created, the managed directory service may transmit the customer directory 522 identification, FQDN and the DNS IP addresses for the customer directory 522 to the management sub-system 506 within the virtual computer system service 502. Additionally, the management sub-system 506 may receive a temporary set of credentials from the managed directory service 514 that may be used to join the virtual machine instance 510 to the newly created customer directory 522. The management sub-system may transfer this information to a metadata service 508 and make it available to the virtual machine instance 510 once it is created. As noted above, the management sub-system 506 may further process the customer request to create a new virtual machine instance 510 and instantiate the virtual machine instance 510 in a physical host, as described in connection with FIG. 3.

Once the virtual machine instance 510 has been instantiated, an agent 512 within the virtual machine instance 510 may transmit one or more executable instructions to the metadata service 508 within the virtual computer system service 502 to obtain the FQDN, DNS IP addresses and the temporary set of credentials necessary to join the virtual machine instance 510 to the customer directory 522. Accordingly, the agent 512 operating within the virtual machine instance 510 may utilize the metadata to extract the FQDN, DNS IP addresses, customer directory identification and the temporary set of credentials. Subsequently, the agent 512 may transmit one or more appropriately configured API calls (such as "JoinDirectory( )" as illustrated in FIG. 5) to the customer directory 522 to join the virtual machine instance 510 to the customer directory 522. Accordingly, the customer may utilize a set of credentials for accessing the customer directory 522 to access the virtual machine instance 510 as well.

Figure 6:
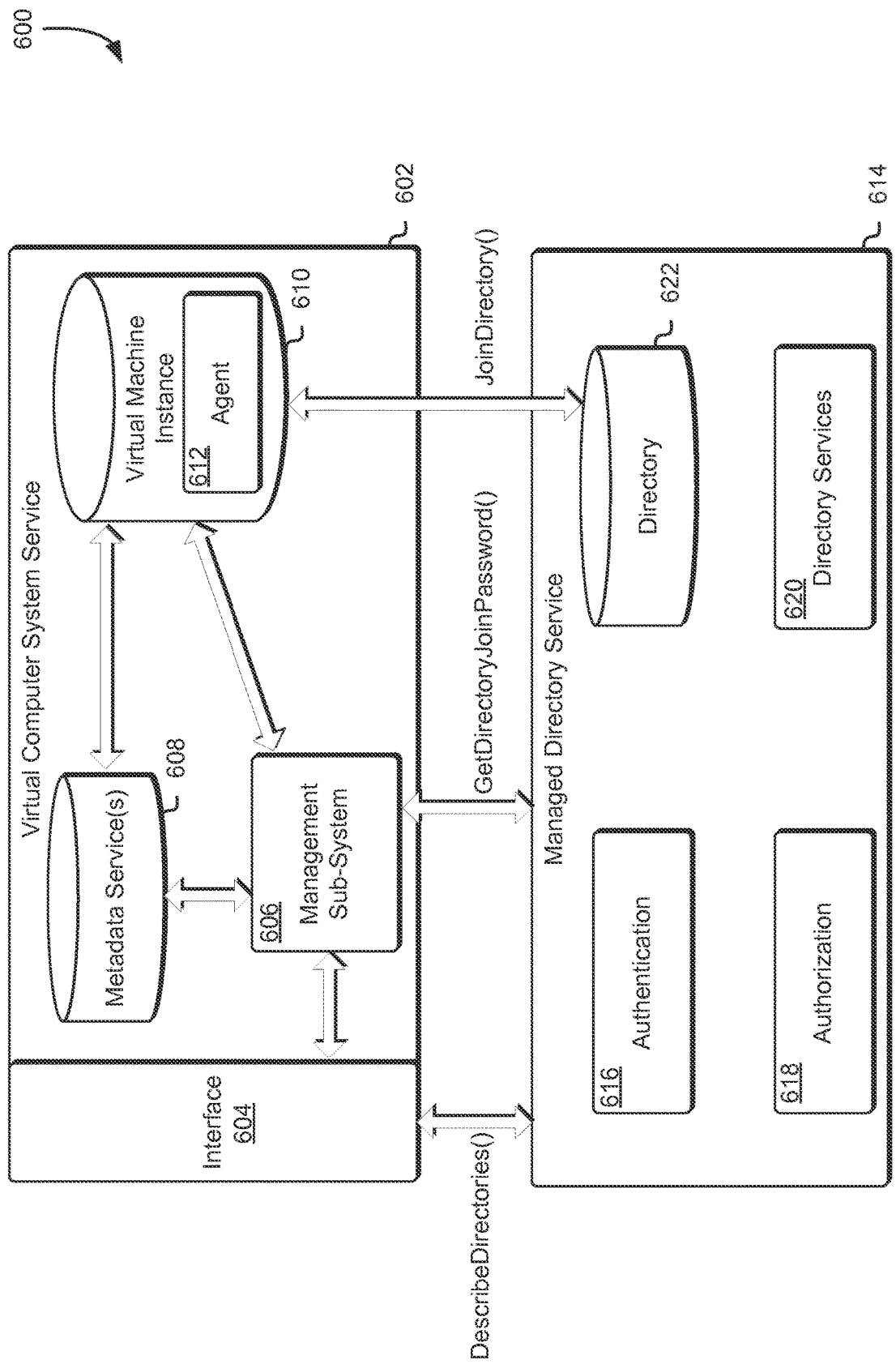
FIG. 6 is an illustrative example of automatic joining of a new virtual machine instance with an existing directory in accordance with at least one embodiment.

In another embodiment, the virtual computer system service may be configured to obtain information from the managed directory service which may be used to join a newly created virtual machine instance to an existing customer directory. Accordingly, FIG. 6 is an illustrative example of an environment 600 in which a virtual machine instance 610 is automatically joined to an existing customer directory 622 in accordance with at least one embodiment. As illustrated in FIG. 5, a customer may access the virtual computer system service 602 through an interface 604 to request provisioning of a new virtual machine instance 610 and further request that the new virtual machine instance 610 be joined to an existing customer directory 622. Accordingly, the interface 604 may be configured to transmit one or more appropriately configured API calls (such as "DescribeDirectory( )" as illustrated in FIG. 6) to an authorization services 618 component of a managed directory service 614 to obtain a listing of currently available customer directories 622 that may be used to join the virtual machine instance 610. It should be understood that if a browser or other application is used to access the interface 604, the listing of currently available customer directories 622 may be transmitted by the managed directory service 614 to the browser or other application. Alternatively, the managed directory service 614 may transmit the listing of currently available customer directories 622 to the virtual computer system service 602, which may, in turn, transmit the listing to the browser or other application used to display the interface 604.

The authorization services 618 component of the managed directory service 614 may be configured to determine if the customer has the authorization to join a virtual machine instance 610 to any of the available customer directories 622. Accordingly, the authorization services 618 component of the managed directory service 614 may transmit the identification of the currently available customer directories 622 that may be used to join the virtual machine instance 610, as well as the FQDN and the DNS IP addresses for each of the customer directories 622. The interface 604 may subsequently present the identification of the customer directories 622 to the customer in order to enable the customer to select the appropriate customer directory 622. In an embodiment, however, if the customer does not have the authorization to join the virtual machine instance 610 to any of the existing customer directories 622, the authorization component 618 of the managed directory service 614 may transmit a null list to the interface in response to the API calls. Accordingly, the interface 604 may be configured to present the customer with the option to create a new customer directory 622 as described above in connection with FIG. 5.

Once the customer selects an existing customer directory 622 that may be used to join the virtual machine instance 610, the interface 604 may transmit the identification of the customer directory 622, as well as the FQDN and DNS IP addresses of the customer directory 622 to a management sub-system 606 within the virtual computer system service 602. Additionally, the management sub-system 606 may be configured to instantiate the requested virtual machine instance 610 in a physical host, as described in FIG. 3. The management sub-system 606 may be configured to transmit one or more appropriately configured API calls (such as "GetDirectoryJoinPassword( )" as illustrated in FIG. 6) to the authorization services 618 component of the managed directory service 614 to request a temporary set of credentials that may be used to join the virtual machine instance 610 to the specified customer directory 622.

Subsequently, the management sub-system 606 may transfer the FQDN, DNS IP addresses and the temporary set of credentials obtained from the authorization component 618 to a metadata service 608 within the virtual computer system service 602. Thus, the FQDN, DNS IP addresses and temporary set of credentials may be made available to the virtual machine instance 610 in the form of metadata stored within the metadata service 608. Accordingly, an agent 612 operating within the virtual machine instance 610 may be configured to transmit one or more appropriately configured API calls to the metadata service 608 to obtain this metadata. The agent 612 may be configured to extract the FQDN, DNS IP addresses and the temporary set of credentials for joining the customer directory 622 from this metadata.

The agent 612 operating within the virtual machine instance 610 may utilize the FQDN and the DNS IP addresses to locate and identify the target customer directory 622 for joining. Accordingly, the agent 612 may be configured to transmit one or more appropriately configured API calls to the customer directory 622 (such as "JoinDirectory( )" as illustrated in FIG. 6) to request joining of the virtual machine instance 610 to the customer directory 622. The agent 612 may be required to transmit the temporary set of credentials to the customer directory 622 to validate the one or more API calls to the customer directory 622 and enable the joining of the virtual machine instance 610. Once the virtual machine instance 610 has been joined with the customer directory 622, the customer may utilize a set of credentials for accessing the customer directory 622 to access the virtual machine instance 610 as well.

Figure 7:
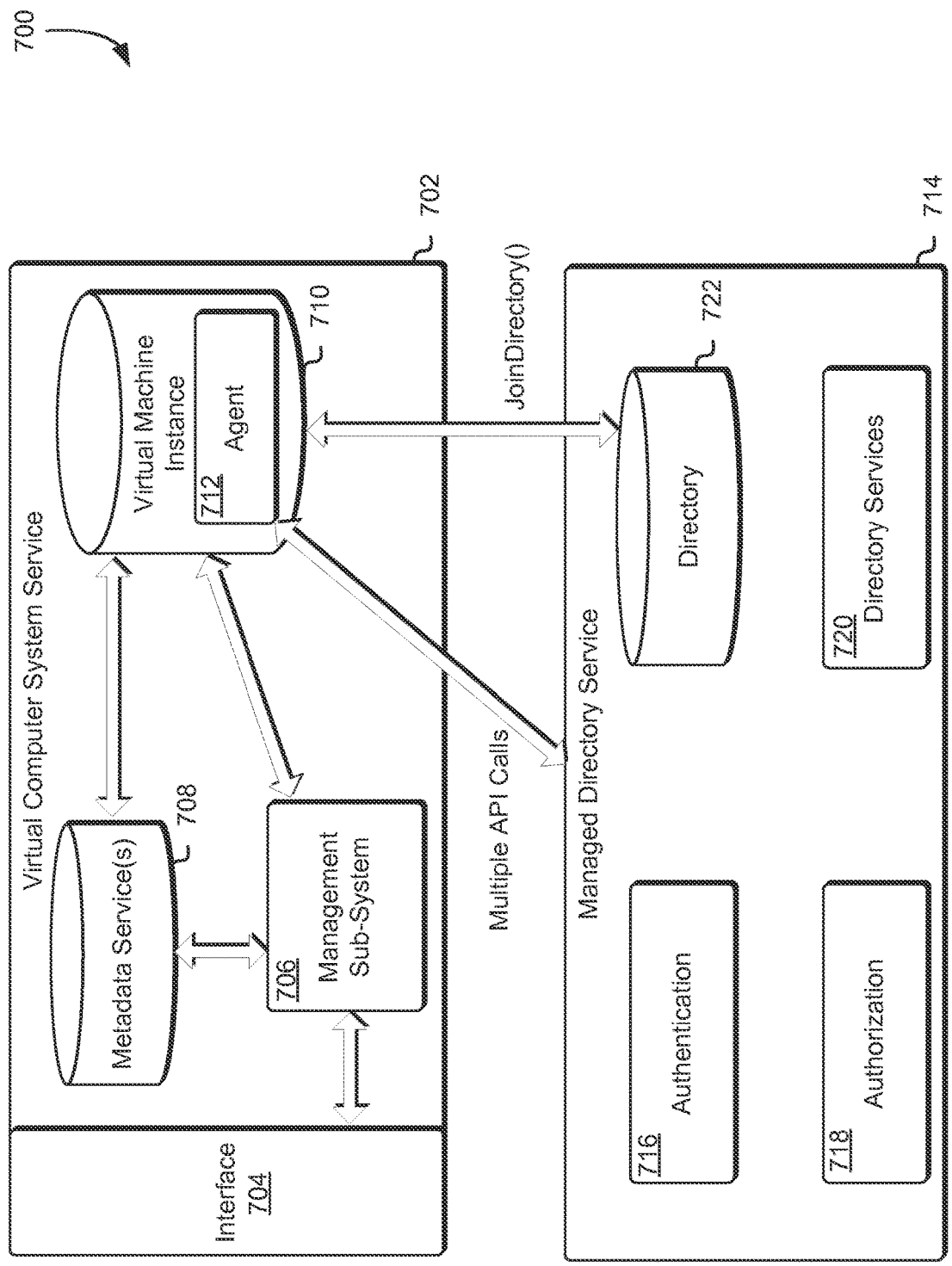
FIG. 7 is an illustrative example of automatic joining of a new virtual machine instance with an existing directory in accordance with at least one embodiment.

In an alternative embodiment, the virtual computer system service may not be configured to transmit one or more API calls to the managed directory service. Accordingly, the request for customer directory information necessary for the virtual machine instance to join the customer directory may need to originate from the virtual machine instance itself. Accordingly, FIG. 7 is an illustrative example of an environment 700 in which a virtual machine instance 710 communicated with a managed directory service 714 to join an existing customer directory 722 in accordance with at least one embodiment.

As described in FIGS. 5 and 6, a customer may access a virtual computer system service 702 through an interface 704 to request provisioning of a new virtual machine instance 710. However, in this particular embodiment, the interface 704 may not include an option for the customer to create a new customer directory 722 or join the virtual machine instance 710 to an existing customer directory 722. Alternatively, the interface 704 may be configured to transmit one or more appropriately configured API calls to the managed directory service 714 to obtain a listing of the identification for each of the available customer directories 722 that the customer may be able to join the virtual machine instance 710 to. However, as illustrated in FIG. 7, the interface 704 may not be configured to obtain the FQDN or the DNS IP addresses for the available customer directories 722 from the managed directory service 714.

Accordingly, the interface 704 may be configured to transmit one or more appropriately configured API calls to a management sub-system 706 within the virtual computer system service 702 to request provisioning of the virtual machine instance 710 based at least in part on the request from the customer. Additionally, in the embodiment where the interface 704 is configured to obtain a listing of the identification for each of the available customer directories 722 that may be used to join the virtual machine instance 710, the management sub-system 706 may transmit the selected customer directory 722 identification to a metadata service 708 in order to make it available to the virtual machine instance 710.

In an embodiment, once the virtual machine instance 710 has been provisioned, an agent 712 operating within the virtual machine instance 710 may transmit one or more appropriately configured API calls to the metadata service 708 to obtain the identification of the customer directory 722 selected by the customer through the interface. Accordingly, the agent 712 may be configured to utilize this identification to transmit one or more appropriately configured API calls (such as "DescribeDirectories( )" and "GetDirectoryJoinPassword( )" as described in FIGS. 5 and 6) to the managed directory service 714 to obtain the FQDN, DNS IP addresses and a temporary set of credentials that may be used to join the virtual machine instance 710 to the specified customer directory 722. Thus, the agent 712 may be configured to utilize the FQDN and the DNS IP addresses to establish a connection with the customer directory 722 and transmit one or more appropriately configured API calls (such as "JoinDirectory( )" as illustrated in FIG. 7) to the customer directory 722 to join the virtual machine instance 710 to the customer directory 722.

Alternatively, in an embodiment, if the interface 704 is not configured to obtain any details regarding all available customer directories 722 from the managed directory service 714, the virtual machine instance 710 may be configured to allow a customer to request that the virtual machine instance 710 join an existing customer directory 722. Accordingly, an agent 712 operating within the virtual machine instance 710 may be configured to transmit one or more appropriately configured API calls (such as "DescribeDirectories( )") to obtain a listing of all available customer directories 722 that the customer may use to join the virtual machine instance 710. Additionally, the agent 712 may obtain the FQDN and DNS IP addresses for each of the available customer directories 722. If the customer utilizing the virtual machine instance 710 selects an appropriate customer directory 722, the agent 712 may transmit a second appropriately configured API call (such as "GetDirectoryJoinPassword( )") to the managed directory service 714 to obtain a temporary set of credentials that may be used to join the virtual machine instance 710 to the selected customer directory 722. Accordingly, the agent 712 may be configured to utilize the FQDN and DNS IP addresses for the selected customer directory 722 to establish a connection with the selected customer directory 722. Subsequently, the agent 712 may transmit one or more appropriately configured API calls (such as "JoinDirectory( )"), as well as the temporary set of credentials, to the customer directory 722 to join the virtual machine instance 710. Once the virtual machine instance 710 has been joined with the customer directory 722, the customer may utilize a set of credentials for accessing the customer directory 722 to access the virtual machine instance 710 as well.

Figure 8:
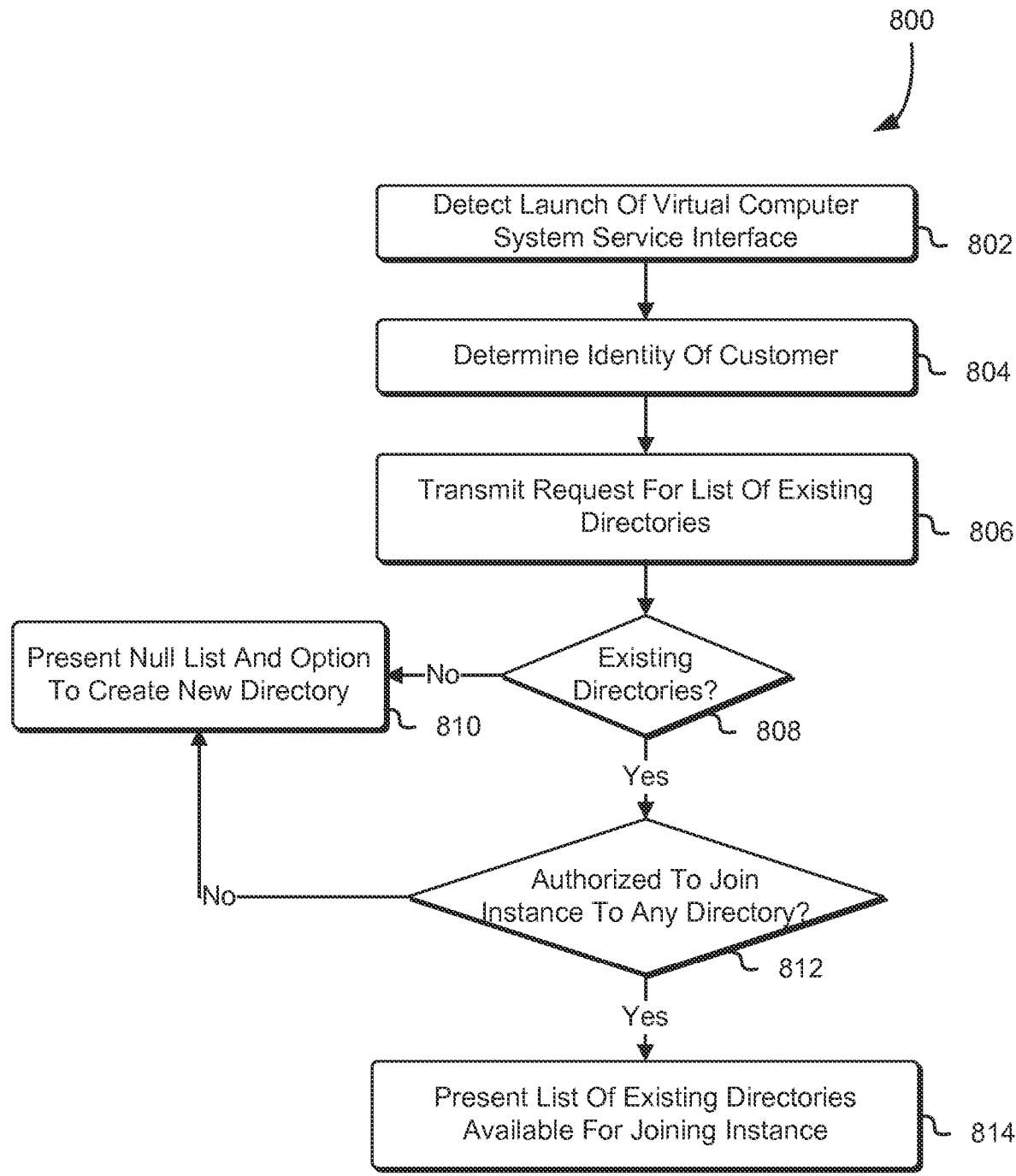
FIG. 8 is an illustrative example of a process for providing an interface that includes a selection menu for joining a new virtual machine instance to an existing directory in accordance with at least one embodiment.

As noted above, a customer may utilize an interface provided by a virtual computer system service to request provisioning of a virtual machine instance, as well as request that this virtual machine instance be joined to either a new or existing customer directory. Accordingly, FIG. 8 is an illustrative example of a process 800 for providing an interface that includes a selection menu for joining a new virtual machine instance to an existing directory in accordance with at least one embodiment. The process 800 may be performed by a properly configured virtual or other computer system service in connection with an interface configured to receive customer requests and transmit a request for customer directories and, in some embodiments, one or more API calls to a managed directory service. Accordingly, the managed directory service may be configured to perform some of the actions provided in the process 800.

A customer may access the virtual computer system service through an interface by utilizing a set of credentials provided to the customer by the computing resource service provider. Accordingly, the virtual computer system service may detect 802 that a customer has launched an interface which may be used to provision a new virtual machine instance and join this new virtual machine instance to a new or existing customer directory. The customer may utilize the interface to specify the operating system and applications that are to be included in the virtual machine instance, as well as the computing resources that should be used to instantiate the virtual machine instance.

In order to determine whether the customer has the authorization to join this virtual machine instance to an existing customer directory, the interface may be configured to transmit the received set of credentials to an identity management service to determine 804 the identity of the customer. For instance, the identity management service may include a customer profile which may include one or more policies that may affect this particular customer. For example, the customer may only be authorized to create a virtual machine instance but may not have access to a managed directory service or other service provided by the computing resource service provider. Accordingly, if the customer does not have access to these services, the interface may not include any options for utilizing the virtual machine instance to interact with these services. Alternatively, the identity management service may include additional customer credentials that may be used to access these additional services. Accordingly, the interface may obtain the customer identification and credentials utilized to access a managed directory service in order to determine the customer's level of access within the managed directory service.

The interface may be configured to subsequently transmit 806 a request, as well as the customer identity and credentials, to a managed directory service to obtain a listing of existing customer directories that may be used to join the new virtual machine instance. In some embodiments, if the virtual computer system service is configured to communicate through one or more appropriately configured API calls to the managed directory service, the interface may additionally request the FQDN and DNS IP addresses for each of the existing customer directories that may be used. However, in an embodiment, if the virtual computer system service is not configured to obtain the FQDN and DNS IP addresses for each of the existing customer directories, the interface may only request the identification of each of the existing customer directories.

Thus, the managed directory service may be configured to process the request from the interface provided by the virtual computer system service to determine 808 if the customer has any existing customer directories. If the customer does not have any existing customer directories that may be used to join the new virtual machine instance, the managed directory service may transmit a null list to the interface. Accordingly, the interface may be configured to present 810 this null list to the customer and present the customer with an option to create a new customer directory.

However, if the customer does have one or more existing customer directories available, the managed directory service may be configured to determine 812 whether the customer is authorized to utilize any of the existing customer directories to join the new virtual machine instance. Accordingly, the managed directory service may be configured to utilize the received customer credentials to refer to a customer profile and the policies set forth in each of the customer directories to determine the level of access the customer has to these directories. As an example, the customer may have previously specified that a particular customer directory can never be attached to a virtual machine instance due to certain security concerns. Thus, if the managed directory service determines that the customer is not authorized to utilize any of the existing customer directories to join the new virtual machine instance, the directory may transmit a null list to the interface, causing the interface to present 810 the null list to the customer and present the customer with an option to create a new customer directory.

If one or more existing customer directories are available, and the customer is permitted to join the virtual machine instance to any of these existing customer directories, the managed directory service may transmit the list of these customer directories to the interface. Additionally, in some embodiments, the managed directory service may additionally transmit the FQDN and DNS IP addresses for each of these customer directories to the interface. Accordingly, the interface may receive the list from the managed directory service and present 814 this list of existing directories available for joining the new virtual machine instance to the customer. In this manner, the customer may not only specify the parameters for the new virtual machine instance but also identify a customer directory that may be used to join the virtual machine instance.

Figure 9:
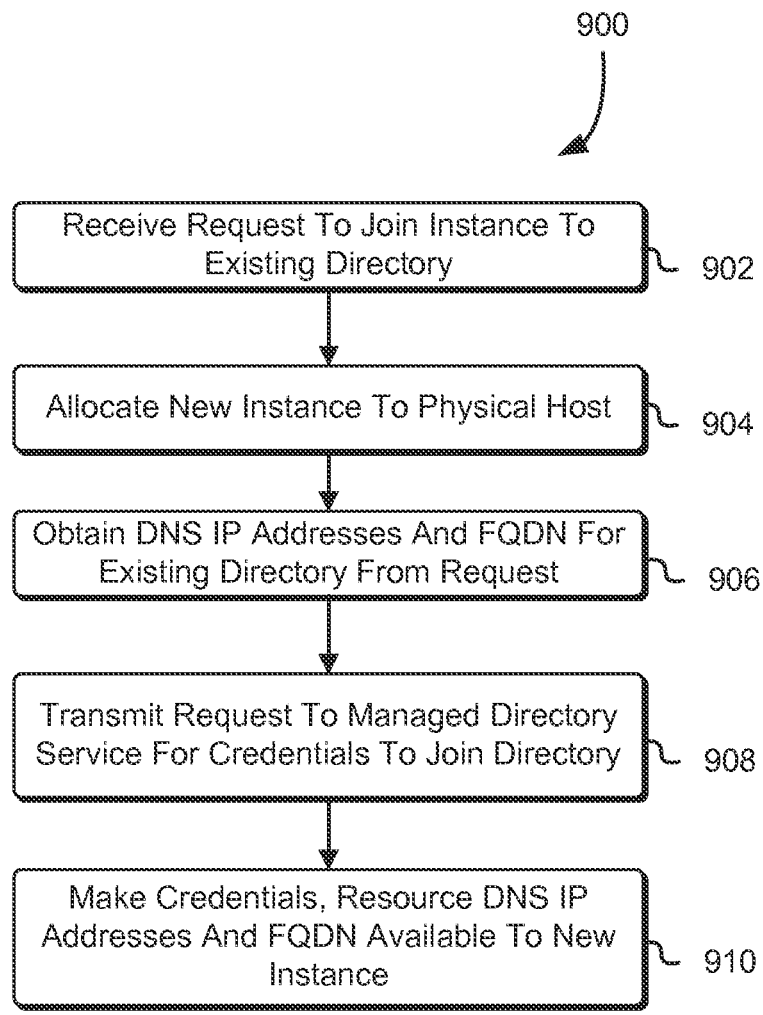
FIG. 9 is an illustrative example of a process for preparing a new virtual machine instance for automatic joining to an existing directory in accordance with at least one embodiment.

As noted above, the virtual computer system service may be configured to obtain the information necessary for a virtual machine instance to join an existing or new customer directory. Accordingly, FIG. 9 is an illustrative example of a process 900 for preparing a new virtual machine instance for automatic joining to an existing directory in accordance with at least one embodiment. The process 900 may be performed by a management sub-system component of a virtual or other computer system service, such as illustrated and described in FIG. 6. Additionally, performance of the process 900 may additionally involve a metadata service within the virtual computer system service. The process 900 may be performed subsequent to the process described above in connection with FIG. 8.

Subsequent to a customer submitting a request, through an interface, to provision a new virtual machine instance and to join this new virtual machine instance to a new or existing customer directory, the management sub-system may receive 902 this request. The request may include the customer-specified computing directories that should be used to provision the instance. Thus, as illustrated in connection with FIG. 3, the management sub-system may be configured to obtain the appropriate machine image from the virtual computer system service and instantiate this image on to a physical host. Thus, the management sub-system may allocate 904 this new virtual machine instance on to a physical host and make it available to the customer.

In addition to the computing resources that should be used to provision the virtual machine instance, the request may include the FQDN and DNS IP addresses for the customer directory that should be used to join the virtual machine instance. As illustrated in FIG. 8, the interface may be configured to obtain the FQDN and DNS IP addresses for each of the customer directories that are available and the customer has the requisite permissions to join with the virtual machine instance. Accordingly, once the customer selects an appropriate customer directory, the interface may transmit the FQDN and DNS IP addresses for that customer directory to the management sub-system. Thus, the management sub-system may be configured to further obtain 906 the FQDN and the DNS IP addresses for the selected customer directory. In an embodiment, if a new customer directory has been created subsequent to a request obtained from the interface, the managed directory service may transmit the FQDN and the DNS IP addresses directly to the management sub-system.

Once the management sub-system has obtained the FQDN and the DNS IP addresses from either the customer request received from the interface or from the managed directory service directly, the management sub-system may transmit 908 a request, such as through one or more API calls to the service, to the managed directory service to obtain a set of temporary credentials that may be used to join the virtual machine instance to the selected customer directory. Accordingly, the managed directory service may refer to a database to determine the proper set of temporary credentials that may be used to join the virtual machine instance to the selected customer directory. This set of temporary credentials may be active for a limited time and, if not used, may expire. This may prevent other virtual machine instances from attempting to join the existing customer directory. Once the managed directory service has obtained this set of temporary credentials, the managed directory service may transmit the set of temporary credentials to the management-sub-system.

Once the management sub-system has obtained the set of temporary credentials from the managed directory service, the management sub-system may make 910 these credentials, as well as the FQDN and DNS IP addresses for the selected customer directory, available to the virtual machine instance in the form of metadata. Thus, the management sub-system may be configured to transfer the set of temporary credentials, the FQDN and the DNS IP addresses for the selected customer directory to a metadata service within the virtual computer system service. As will be illustrated below in connection with FIG. 10, the virtual machine instance may include an agent operating within the virtual machine instance that is configured to obtain this metadata to join the virtual machine instance to the customer directory.

Figure 10:
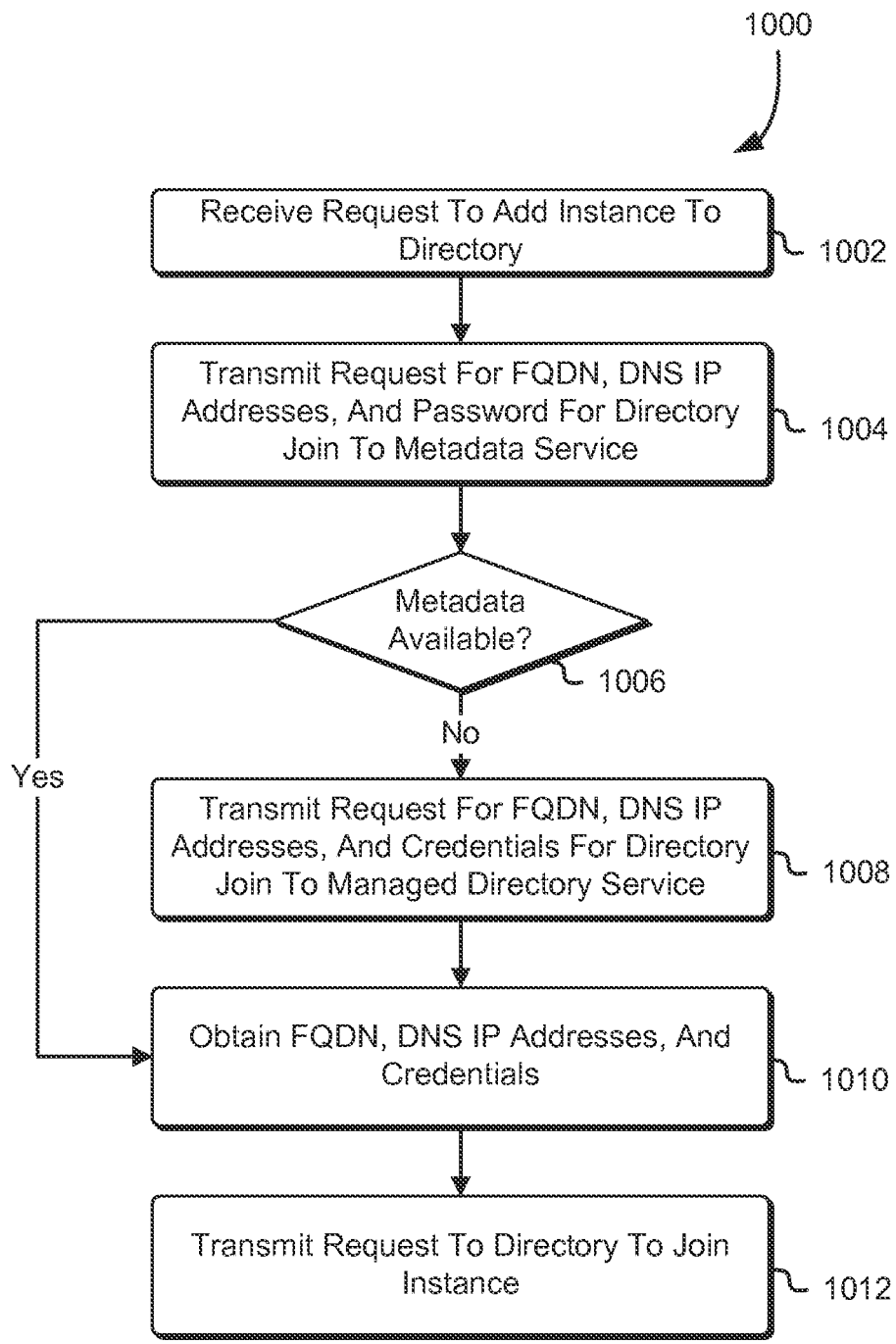
FIG. 10 is an illustrative example of a process for joining a new virtual machine instance to an existing directory in accordance with at least one embodiment.

After the virtual machine instance has been provisioned and is operational, an agent operating within the virtual machine instance may proceed to request that the virtual machine instance join the selected customer directory. Accordingly, FIG. 10 is an illustrative example of a process 1000 for joining a new virtual machine instance to an existing customer directory in accordance with at least one embodiment, although the techniques described in connection with FIG. 10 and elsewhere herein are adaptable to use in connection with other computer system instances that are not necessarily virtual. The process 1000, as noted above, may be performed by an agent operating within the virtual machine instance. The agent may be configured to transmit one or more API calls to the virtual computer system service, the managed directory service and the customer directory to obtain information necessary to join the virtual machine instance to the customer directory.

Accordingly, the agent operating within the virtual machine instance may receive 1002 a request to join the virtual machine instance to the existing customer directory. In an embodiment, the customer transmits a request, through an interface provided by the virtual computer system service, to provision a new virtual machine instance and join this instance to a customer directory. This request may be transmitted to a management sub-system within the virtual computer system service, which may be configured to provision the new virtual machine instance and prepare information necessary for the virtual machine instance to join the customer directory by transmitting this information to a metadata service. The request for the virtual machine instance to join the customer directory may be transmitted to the agent operating within the virtual machine instance. In an alternative embodiment, if the virtual computer system service is not configured to obtain the information necessary to join the virtual machine instance to the customer directory, a customer can submit a request through the virtual machine instance itself to join the virtual machine instance to the customer directory. This request may then be transferred to the agent operating within the virtual machine instance.

Once the agent has received the request to join the virtual machine instance to the customer directory, the agent may transmit 1004 a request to the metadata service to obtain the FQDN, DNS IP addresses and the set of temporary credentials necessary to establish a connection with the customer directory and join the virtual machine instance to the customer directory. As noted above, the management sub-system component within the virtual computer system service may be configured to obtain the FQDN and DNS IP addresses for the selected customer directory from the initial customer request made through the interface. Additionally, the management sub-system may transmit one or more appropriately configured API calls to the managed directory service to obtain a set of temporary credentials that may be used to join the virtual machine instance to the customer directory. Accordingly, the management sub-system may make the FQDN, DNS IP addresses and the set of temporary credentials available to the agent in the form of metadata through the metadata service.

In an embodiment, the virtual computer system service, however, may not be configured to obtain the FQDN, DNS IP addresses and the set of temporary credentials from the managed directory service. Thus, in this embodiment, the metadata service will not include this information. Accordingly, the agent may be configured to determine 1006 whether the metadata is available from the metadata service. For instance, in response to the request from the agent for this metadata, the metadata service may return a null list or an error message indicating that the requested metadata is not available. Alternatively, if the virtual computer system service is configured to obtain the FQDN, DNS IP addresses and the set of temporary credentials from the managed directory service, the metadata service may provide this information to the agent in the form of metadata in response to the request.

If the metadata is not available from the metadata service, the agent operating within the virtual machine instance may be configured to transmit 1008 a request to the managed directory service to obtain the FQDN and DNS IP addresses for the selected customer directory, as well as a request to obtain a set of temporary credentials which may be necessary to join the virtual machine instance to the customer directory. In response, the managed directory service may transmit the FQDN and DNS IP addresses for the selected customer directory to the agent for establishing a connection to the customer directory. Additionally, the managed directory service may transmit the set of temporary credentials to the agent in response to the request.

Once the metadata service or the managed directory service has transmitted the FQDN and the DNS IP addresses for the customer directory, as well as the set of temporary credentials, to the agent, the agent may obtain 1010 this information and prepare the virtual machine instance for joining the customer directory. For instance, in an embodiment, when the agent receives the metadata from the metadata service in response to the request, the agent will extract the FQDN, DNS IP addresses and the set of temporary credentials from the metadata. Accordingly, the agent may utilize the FQDN and DNS IP addresses to establish a connection with the selected customer instance. This may enable the agent to transmit one or more appropriately configured API calls to the customer directory to perform one or more actions.

Thus, once the connection has been established with the customer directory, the agent may transmit 1012 a request to the customer directory to join the virtual machine instance to the customer directory. As noted above, the agent may transmit this request through one or more appropriately configured API calls (such as "JoinDirectory( )" as illustrated above) to the customer directory. Additionally, in order to transmit this request, the agent may utilize the set of temporary credentials which may be used to verify that the agent is authorized to transmit the API calls to the customer directory. In response to the request, the customer directory may authorize the joining of the virtual machine instance to the customer directory, enabling a customer to utilize a set of credentials for the customer directory to access the virtual machine instance.

Figure 11:
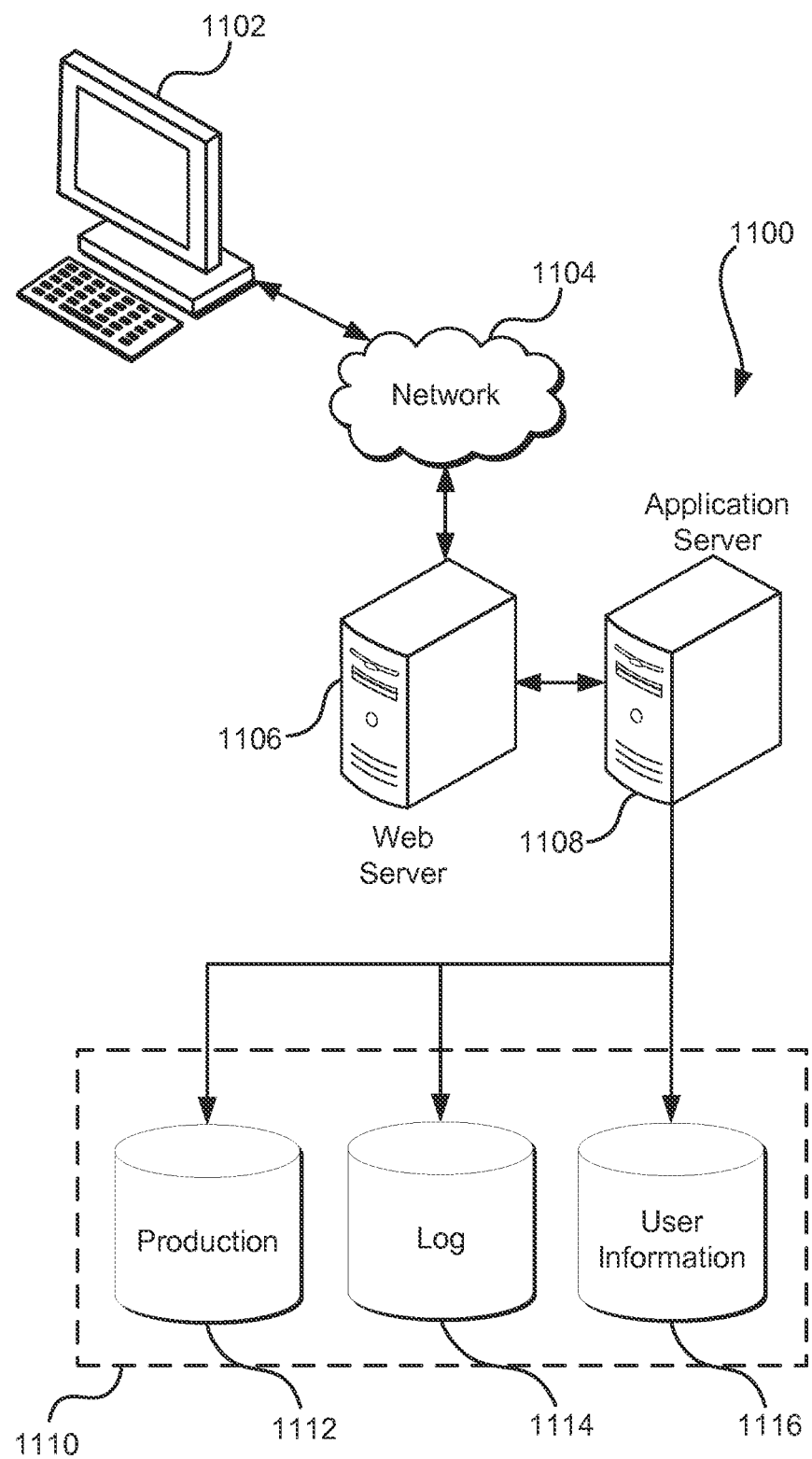
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network Resource ("NFS"), Common Internet Resource ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C#or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   transmitting, to a first server, a request for network address information of a particular directory of a plurality of directories;
   obtaining the network address information of the particular directory, the particular directory including a database of information about resources and relationships among the resources and users of the resources to enable the particular directory to be used to manage access to the resources for the users;
   provisioning a virtual machine instance;
   obtaining, from a second server that maintains the plurality of directories, a set of credentials to join the virtual machine instance to the particular directory, wherein the second server enables access to the resources of the particular directory by providing one or more locations of the resources; and
   causing the virtual machine instance to use the network address information to establish a connection with the particular directory and utilize the set of credentials to join the virtual machine instance to the particular directory.

2. The computer-implemented method of claim 1, wherein the virtual machine instance comprises an agent that utilizes the network address information to establish the connection with the particular directory and utilize the set of credentials to join the virtual machine instance to the particular directory.

3. The computer-implemented method of claim 1, wherein the network address information comprises a fully qualified domain name and one or more domain name system Internet Protocol addresses associated with the particular directory.

4. The computer-implemented method of claim 1, wherein the first server comprises a metadata service that:
   stores, as metadata, the network address information associated with the particular directory; and
   provides the metadata to the virtual machine instance prior to the virtual machine instance utilizing the network address information to establish a connection with the particular directory.

5. The computer-implemented method of claim 1, further comprising, prior to obtaining the network address information, transmitting a request for network address information for corresponding directories of the plurality of directories.

6. The computer-implemented method of claim 1, wherein the virtual machine instance transmits a request to the second server to obtain the set of credentials.

7. A computer system, comprising:
   one or more processors; and
   memory storing a set of instructions, which as a result of being performed by the one or more processors, cause the computer system to at least:
      obtain a first request for network address information for a particular directory of a plurality of directories, the network address information usable to establish a connection to the particular directory, the particular directory comprising information about relationships between resources and users to enable the particular directory to be used to manage access to the resources for users;
      transmit, to a computer system instance, the network address information;
      obtain a second request for a set of credentials to join the computer system instance to the particular directory;
      obtain, in response to the second request, the set of credentials from a server that maintains the plurality of directories, wherein the server provides access to the resources of the particular directory by providing identifiers of the resources; and
      transmit, to the computer system instance, the set of credentials to cause the computer system instance to use the network address information to establish a connection with the particular directory and to use the set of credentials to join the particular directory.

8. The computer system of claim 7, wherein the computer system instance is hosted by a computer system service different than a managed directory service that maintains the particular directory.

9. The computer system of claim 7, wherein the network address information comprises a fully qualified domain name and one or more domain name system Internet Protocol addresses associated with the particular directory.

10. The computer system of claim 7, wherein the computer system instance comprises an agent that uses the network address information to establish the connection with the particular directory and uses the set of credentials to join the computer system instance to the particular directory.

11. The computer system of claim 7, wherein the computer system instance uses the set of credentials to submit an application programming interface command, to cause a managed directory service that maintains the particular directory to join the computer system instance to the particular directory.

12. The computer system of claim 7, wherein the computer system instance submits application programming interface commands to the computer system, wherein the application programming interface commands cause the computer system to:
   transmit the network address information to the computer system instance; and
   transmit the set of credentials to the particular directory.

13. The computer system of claim 7, wherein the particular directory is associated with a policy that, as a result of being of being applied, causes one or more computer system instances to join the particular directory.

14. The computer system of claim 7, wherein the first request for network address information is included within a request to provision the computer system instance.

15. A non-transitory computer-readable storage medium storing thereon a set of instructions that, as a result of being performed by one or more processors of a computer system, cause the computer system to at least:
   transmit a first request for network address information associated with a particular directory of a plurality of directories, the particular directory including information regarding relationships among resources and users of the resources to enable the particular directory to be used to manage access to the resources for the users;
   provision a computer system instance;
   transmit, to a server that maintains the plurality of directories, a second request for credential information that, as a result of being utilized, causes the computer system instance to join the particular directory, wherein the server facilitates access to the resources of the particular directory by providing one or more locations of the resources;
   obtain the network address information and the credential information; and
   provide the network address information for the particular directory and the credential information to cause the computer system instance to join the particular directory.

16. The non-transitory computer-readable storage medium of claim 15, wherein the computer system instance is hosted by a computer system service different than a managed directory service that maintains the particular directory.

17. The non-transitory computer-readable storage medium of claim 15, wherein the first request and the second request are obtained from the computer system instance.

18. The non-transitory computer-readable storage medium of claim 17, wherein the network address information and the credential information are provided to the computer system instance in response to the first request and the second request.

19. The non-transitory computer-readable storage medium of claim 15, wherein the instructions further cause the computer system to at least store, as metadata, an identification of the particular directory, the network address information and the credential information.

20. The non-transitory computer-readable storage medium of claim 15, wherein the directory is associated with a policy that permits one or more computer system instances to join the particular directory.

21. The non-transitory computer-readable storage medium of claim 15, wherein the set of instructions, as a result of being performed by the one or more processors, further cause the computer system to:
   obtain, from an interface, a third request to provision a second computer system instance, create a different directory and, as a result of the second computer system instance being provisioned, join the second computer system instance to the different directory;
   transmit a fourth request to create the different directory; and
   prior to providing to the computer system instance network address information of the different directory and second credential information that, as a result of being utilized, causes the second computer system instance to join the second computer system instance to the different directory, obtain the network address information of the different directory and the second credential information.

22. The non-transitory computer-readable storage medium of claim 21, wherein the interface is hosted by a computer system service different than a managed directory service that maintains the different directory.

* * * * *